Figure 1:
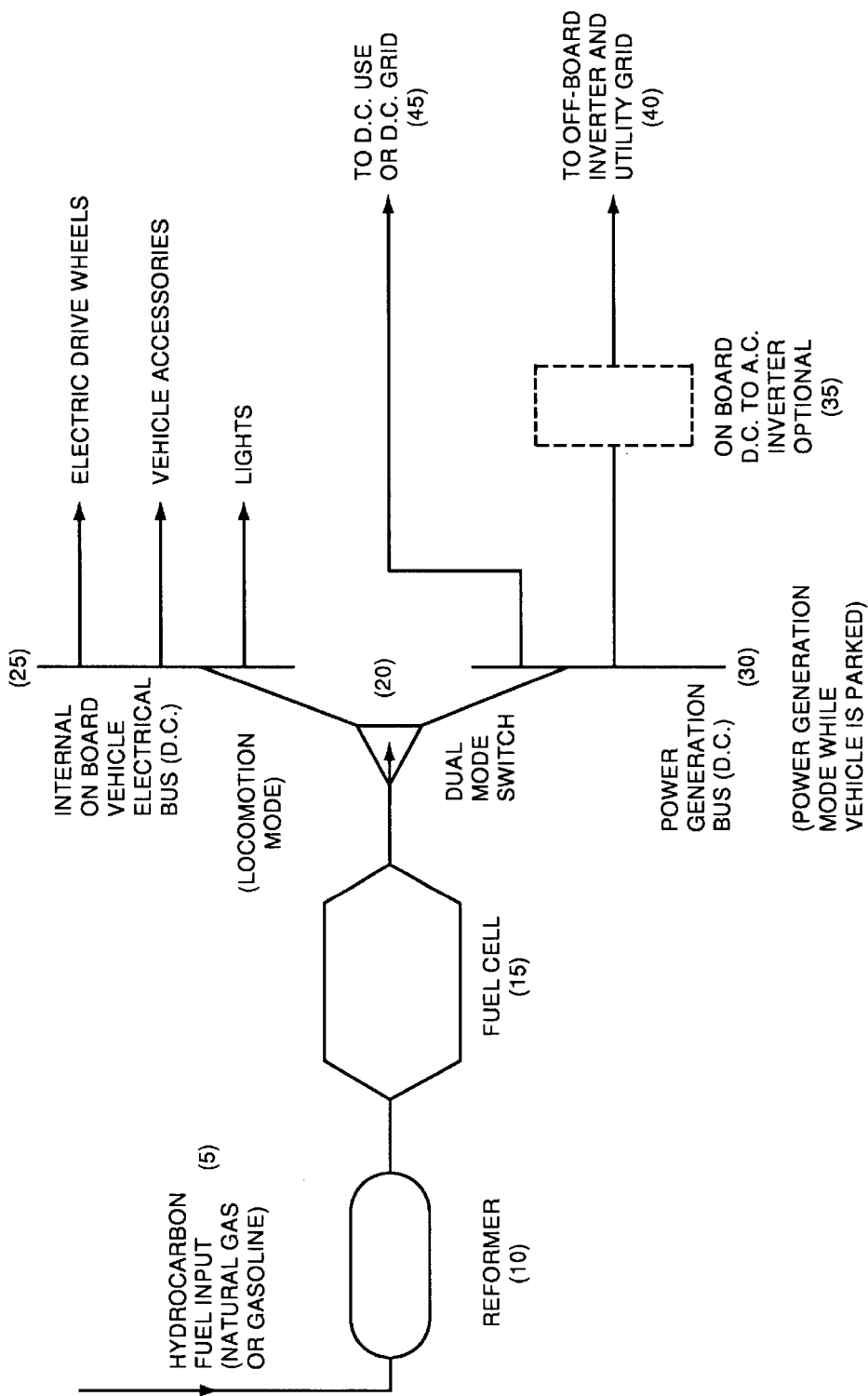

United States Patent [19]
Gore et al.

[11] Patent Number: 6,107,691
[45] Date of Patent: *Aug. 22, 2000

[54] METHODS FOR UTILIZING THE ELECTRICAL AND NON ELECTRICAL OUTPUTS OF FUEL CELL POWERED VEHICLES

[75] Inventors: Gerald E. Gore, North Branch; Wayne K. Wittman, Cranbury; Harry T. Roman, East Orange; Robert A. Gore; Michael D. Gore, both of North Branch, all of N.J.

[73] Assignee: GRoW International Corp., North Branch, N.J.

[ * ] Notice: This patent is subject to a terminal disclaimer.

[21] Appl. No.: 09/094,836

[22] Filed: Jun. 15, 1998

Related U.S. Application Data

[63] Continuation-in-part of application No. 08/557,339, Nov. 14, 1995, Pat. No. 5,767,584.

[51] Int. Cl.[7] ........................................................ H02P 9/04
[52] U.S. Cl. ............................ 290/1 R; 290/4 R; 290/4 A
[58] Field of Search ..................................... 290/1 R, 4 R, 290/4 A, 40 R, 40 B; 60/639; 320/109, 116, 125

[56] References Cited

U.S. PATENT DOCUMENTS

| | | | |
|---|---|---|---|
| 3,664,134 | 5/1972 | Seitz | 60/274 |
| 4,489,242 | 12/1984 | Worst | 307/10 R |
| 4,962,462 | 10/1990 | Fekete | 364/492 |
| 5,434,015 | 7/1995 | Yamada et al. | 429/9 |
| 5,532,573 | 7/1996 | Brown et al. | 322/22 |
| 5,631,532 | 5/1997 | Azuma et al. | 320/5 |
| 5,642,270 | 6/1997 | Green et al. | 363/21 |
| 5,760,488 | 6/1998 | Sonntag | 307/10.1 |
| 5,767,584 | 6/1998 | Gore et al. | 290/1 R |
| 5,803,215 | 9/1998 | Henze et al. | 191/2 |
| 5,929,595 | 7/1999 | Lyons et al. | 320/104 |

*Primary Examiner*—Nicholas Ponomarenko
*Attorney, Agent, or Firm*—Ezra Sutton

[57] ABSTRACT

The present invention provides a method and apparatus for generating electrical power from multiple vehicles powered by fuel cells while the vehicles are parked in a parking lot. A plurality of spaced-apart electrical receptacles are provided for receiving an electric cable for connection to a parked vehicle for electrically connecting the fuel cell in each of the parked vehicles to the plurality of electrical receptacles. An electric power grid is electrically connected to the plurality of electrical receptacles for transferring D.C. electrical power from the fuel cells in the parked vehicles to the electric power grid. At least one electric power collection station is electrically connected to the electric power grid for collecting at a common point the D.C. electric power in the electric power grid. In addition, at least one inverter is electrically connected to the electric power collection station for converting the D.C. electric power to A.C. electric power. Apparatus is provided for supplying the A.C. electric power to a load or a utility grid.

8 Claims, 26 Drawing Sheets

METHODS FOR UTILIZING THE ELECTRICAL AND NON ELECTRICAL OUTPUTS OF FUEL CELL POWERED VEHICLES

I. FIELD OF THE INVENTION

This invention is a continuation-in-part of a recent patent application entitled, "Method for Generating Electrical Power From Fuel Cell Powered Cars Parked in a Conventional Parking Lot", U.S. patent application Ser. No. 08/557, 339 filed Nov. 14, 1995 now U.S. Pat. No. 5,767,584 and relates to the various methods that can be employed to physically connect fuel cell powered cars for he generation of electrical power, and the utilization of useful byproducts of their operation.

II. BACKGROUND OF THE INVENTION

This invention also recognizes that the fundamental unit of future local electric power production will be the fuel cell powered vehicle or car. Since the car is a ubiquitous part of everyday life and always with its driver, the unique characteristics of the fuel cell powered car make it the perfect candidate as a clean local power generation source. In the above patent, the inventors uniquely recognized that the need for electricity literally follows the human around in society. Wherever the human goes, his/her demand for electricity follows. The demand for electricity does not just change with time of day and season, but is literally the movement and location and purpose of humans. And because the car is always a part of where a human goes, this invention combines the human's constant need to move around (transportation), with the human's consequent need for electricity (power production) once the human arrives at his/her destination.

Some new cars contain fuel cell power plants as their prime motive power. The electrical energy generated by these fuel cells energize an electric motor or motors thus propelling the car. Natural gas, hydrogen, or other light gaseous hydrocarbon bearing fuels can be used to provide a fuel input to the fuel cells. Propane, digester or biogas as well as gasoline or other fuels, such as water, that can be processed through a cracking process to produce hydrogen are candidate fuels for the fuel cell.

This invention claims methods and apparatus and utilizes fuel cell powered vehicles or cars to not only generate electrical energy for motion, but when at rest or parked in a parking lot, the fuel cells can be energized and its energy harnessed and focused through an electric power grid so as to provide electrical power for local or distant use.

Traditional combustion engine power plants in cars can also be used to provide extremely limited or nominal amounts of alternating current (A.C.) electrical power through an inverter. Still relatively small amounts of direct current (D.C.) electrical power are produced by these cars, typically utilized to sustain the electrical needs of the car and its accessories. However, it is difficult to obtain useful electrical power from these engines: their low conversion efficiency, their need for cooling by their generated air flow during locomotion, and pollution emissions make them not a candidate nor designed for meaningful power generation. They are designed to be a device purely for the purpose of locomotion. Fuel cells on the other hand have high conversion efficiencies, relatively low emissions, and can be run continuously without the mechanical problems normally encountered with running combustion engines for long periods of time. Fuel cell powered vehicles have an unrecognized and untapped potential.

The prior invention, given the name "Power Park" uniquely capitalizes on the fuel cell powered car as a modular, mobile energy source. A unique feature of this invention is to transform the car or other vehicle from a single use device (i.e. transportation) to a dual use device; one that still provides transportation but also and importantly provides electrical power.

Load as utilized in this patent and claims may include but are not limited to a building, infrastructure to a building, home, grouping of homes, industrial or commercial complex, greenhouse, systems such as the electric utility grid, telephone system/s, cable system/s, catenary system for electric trains, electric utility grid component, electrical control panel or device, energy transforming or inverting device, electric tools such as compressor, motor, motor driven compressor for air compression tools, and any device to include energy storage devices. Energy storage devices may include but are not limited to batteries, capacitors, fly wheels, or pumped hydro storage.

III. SUMMARY OF THE DRAWINGS

A. FIG. 1 shows the general power generation mode for the fuel cell vehicle.

Figure 2:
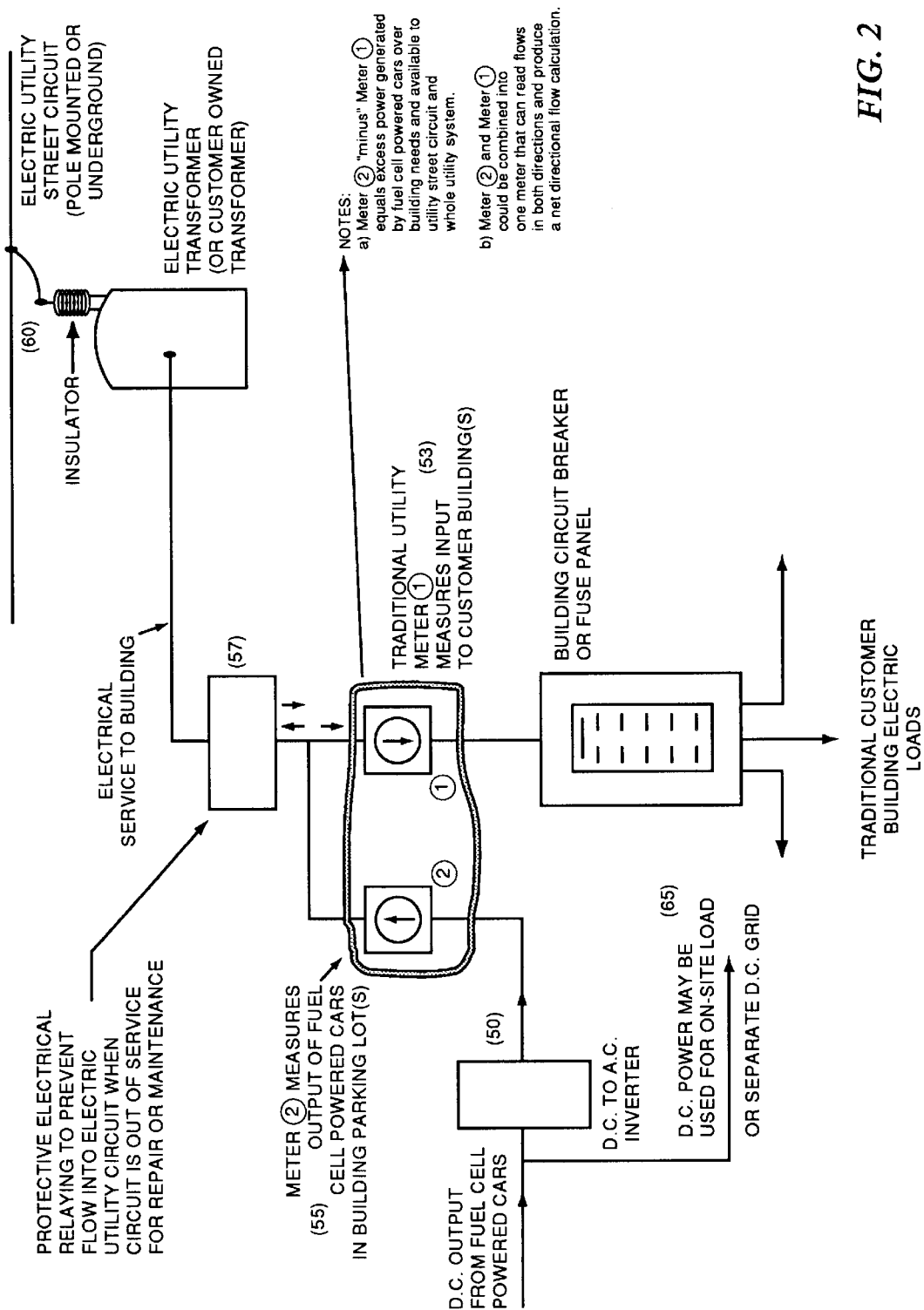

B. FIG. 2 illustrates the interfacing of the output of the fuel cell powered cars output to the utility electric system.

Figure 2A:
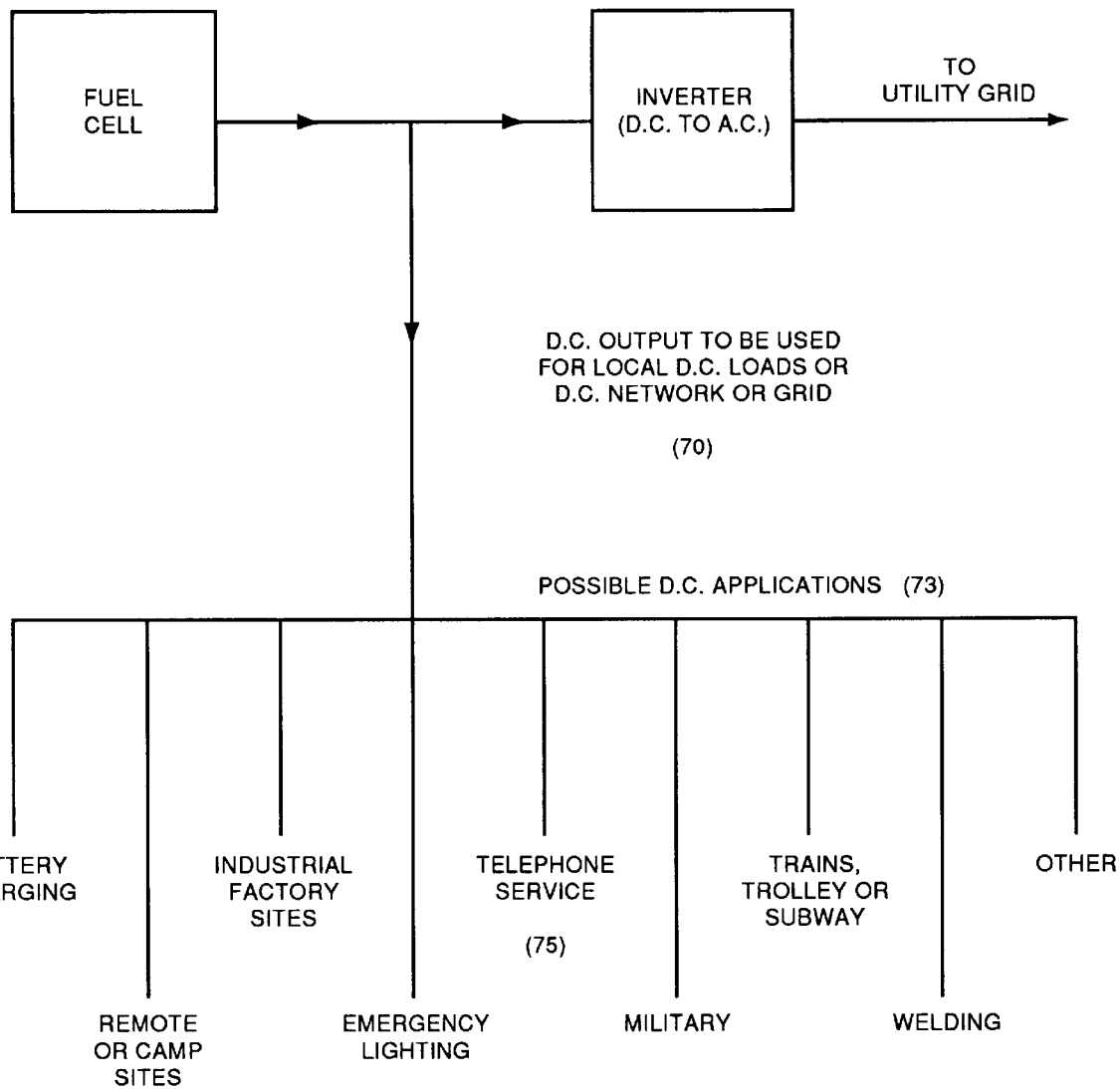

C. FIG. 2a shows how the D.C. output (70) of the fuel cell powered car can be used.

Figure 3:
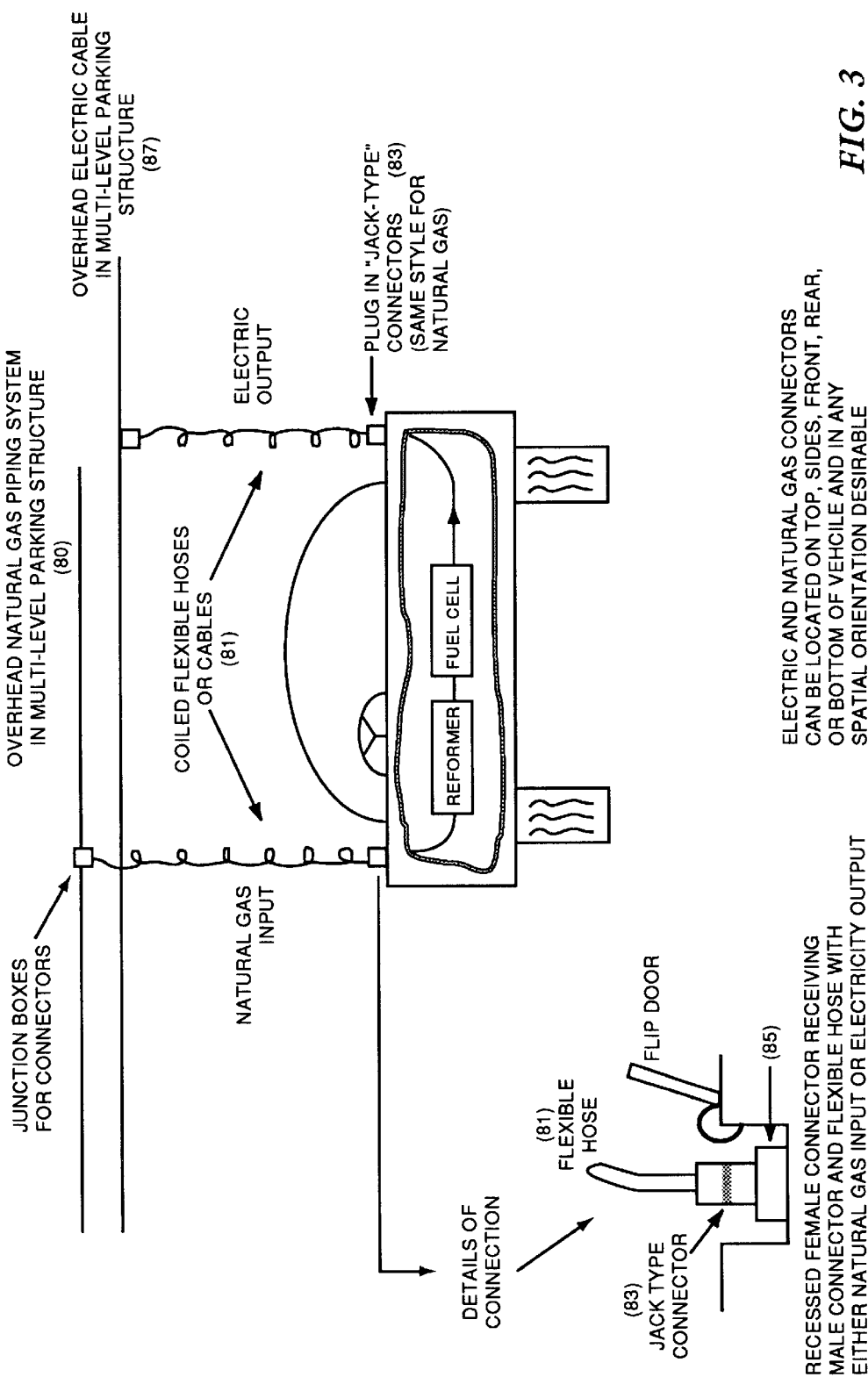

D. FIG. 3 shows how the fuel cell powered car would receive natural gas and generate electricity while parked in a multi-level parking structure.

Figure 4:
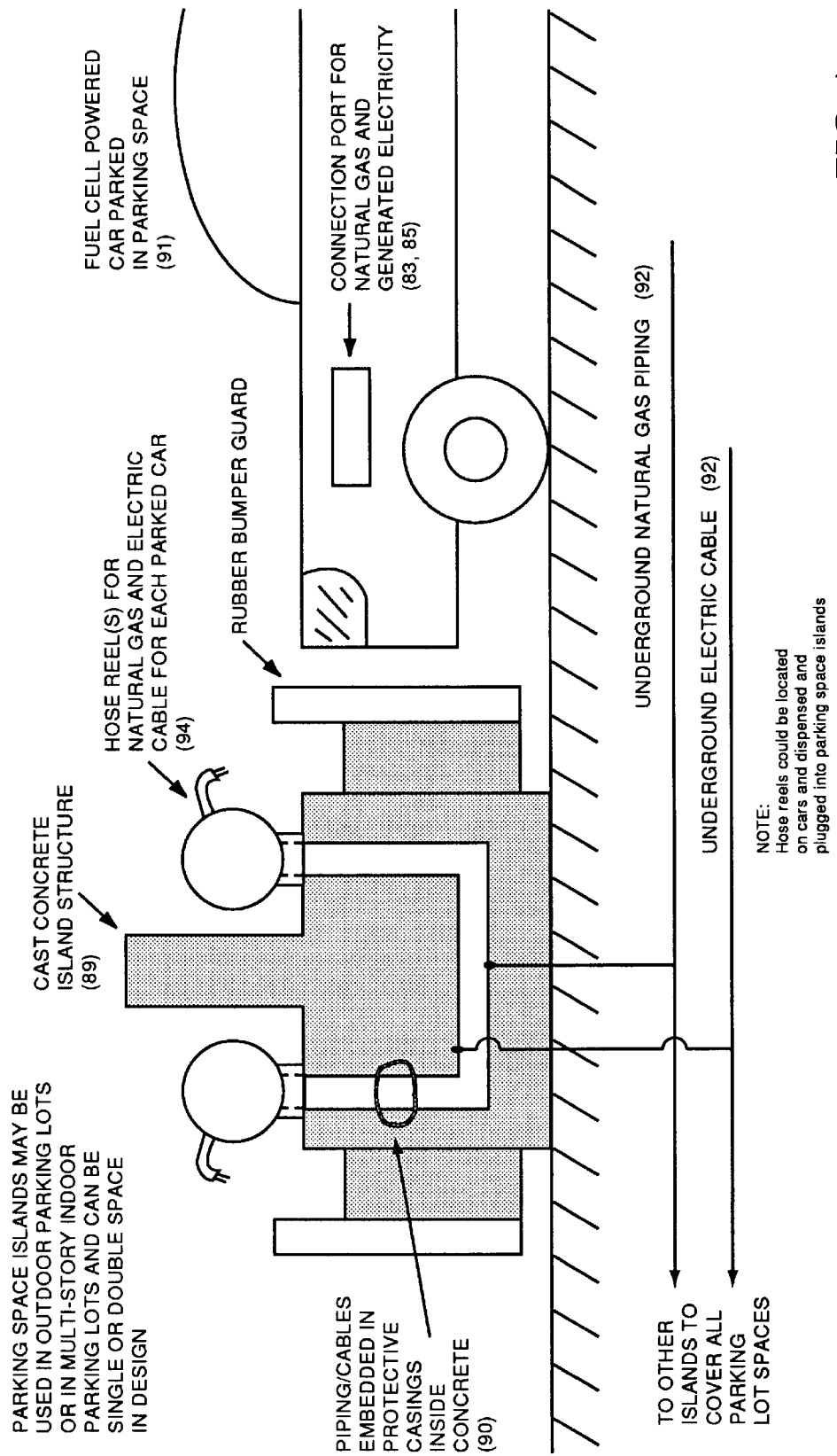

E. FIG. 4 presents a design for parking space islands (89) that would support fuel cell powered cars (91).

Figure 5:
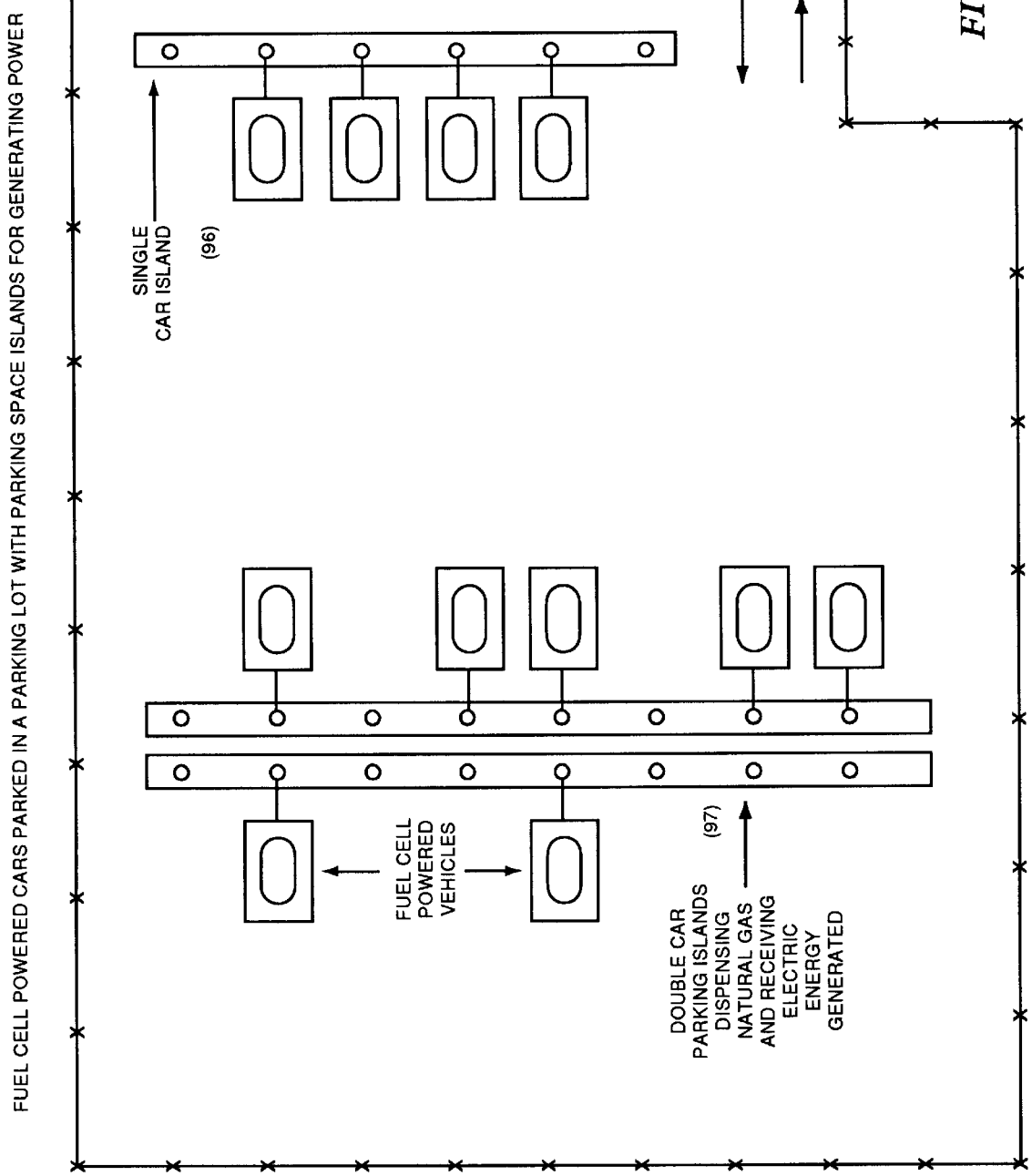

F. FIG. 5 shows a plan layout of an outdoor parking lot with both single (96) and double car islands (97) in use.

Figure 6:
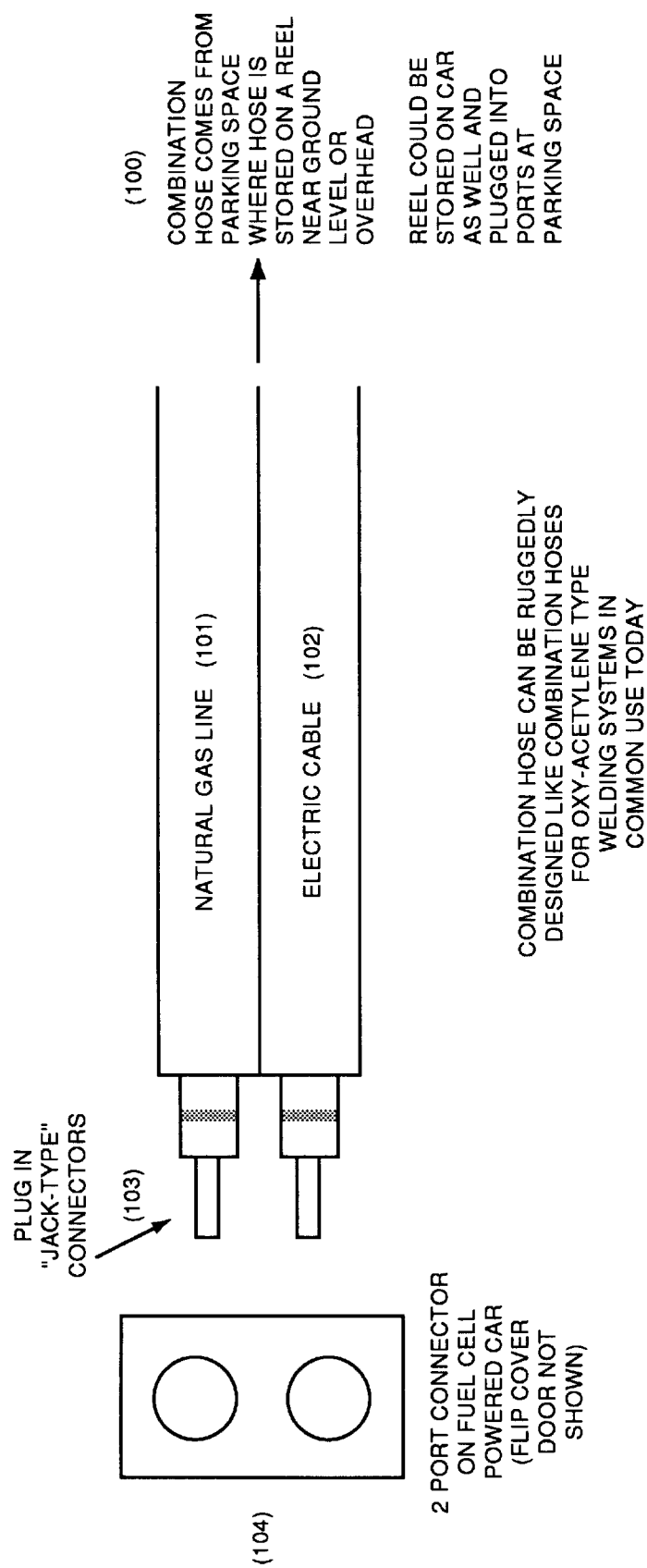

G. FIG. 6 shows a combination gas and electric hose (100) for fuel cell powered vehicles.

Figure 7:
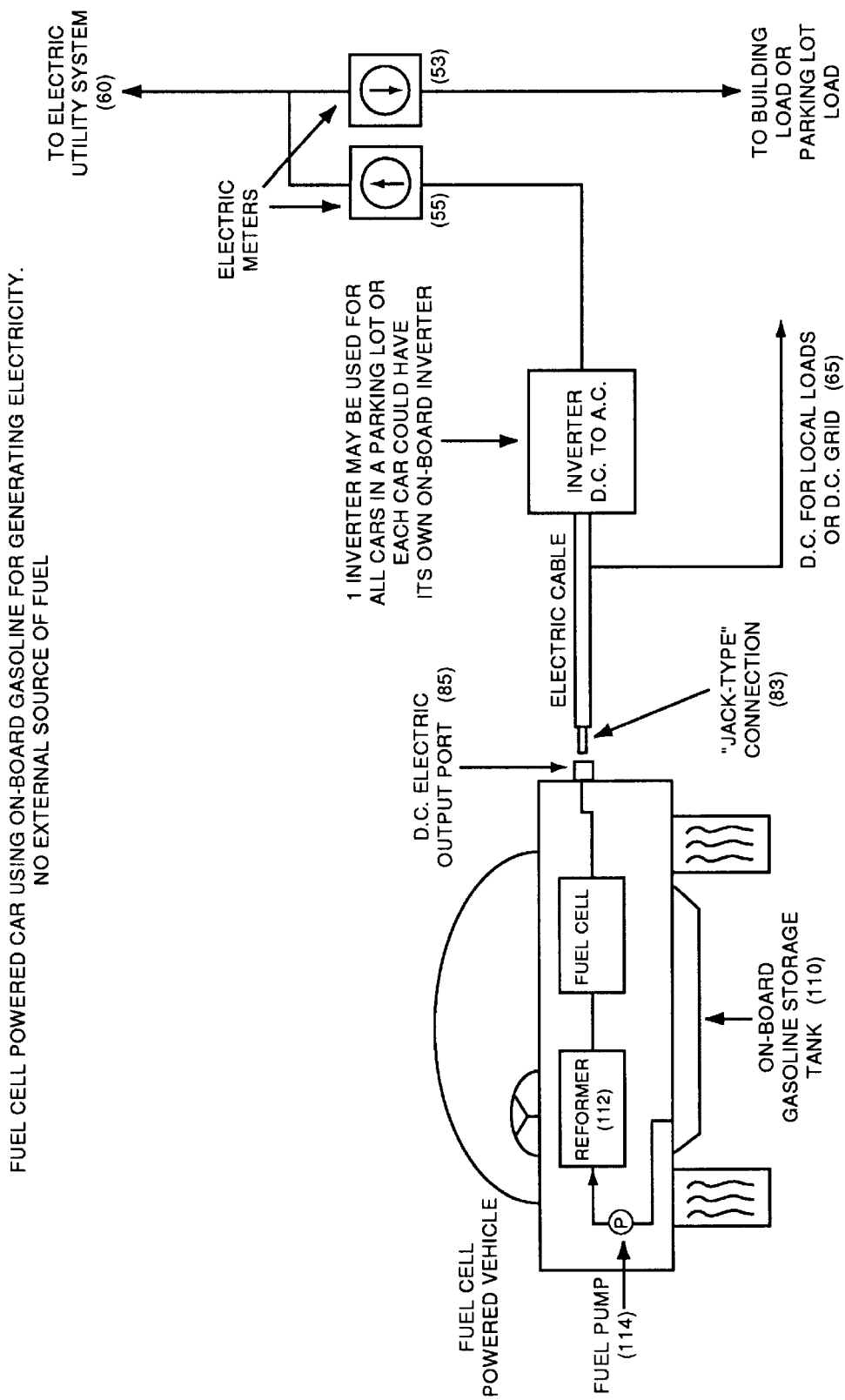

H. FIG. 7 expresses the option of using an on-board gasoline supply (110) of a fuel cell powered vehicle to generate electrical power while parked.

Figure 8:
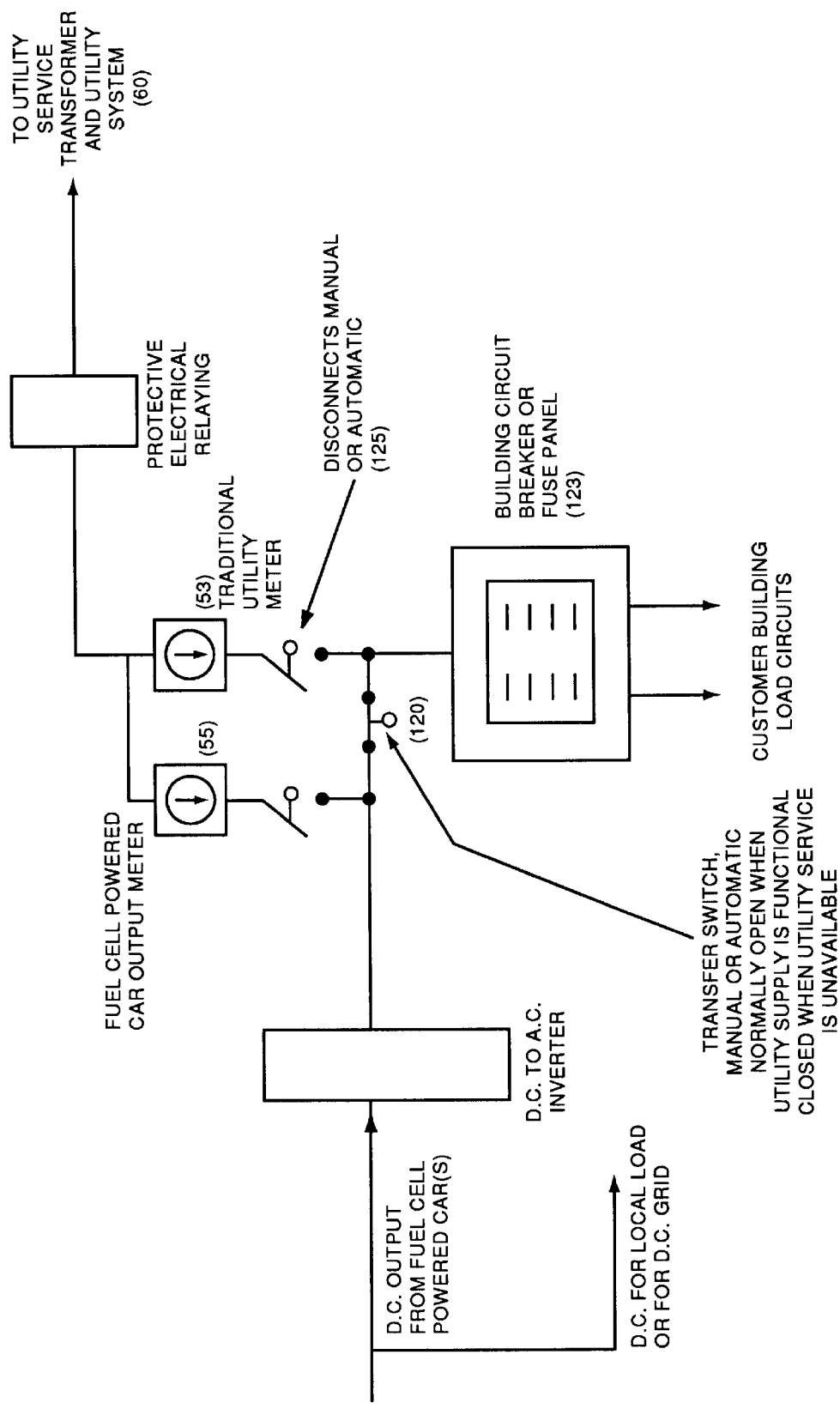

I. FIG. 8 shows the use of a transfer switch (120) for connecting a fuel cell powered car to the building electrical system (123).

Figure 9:
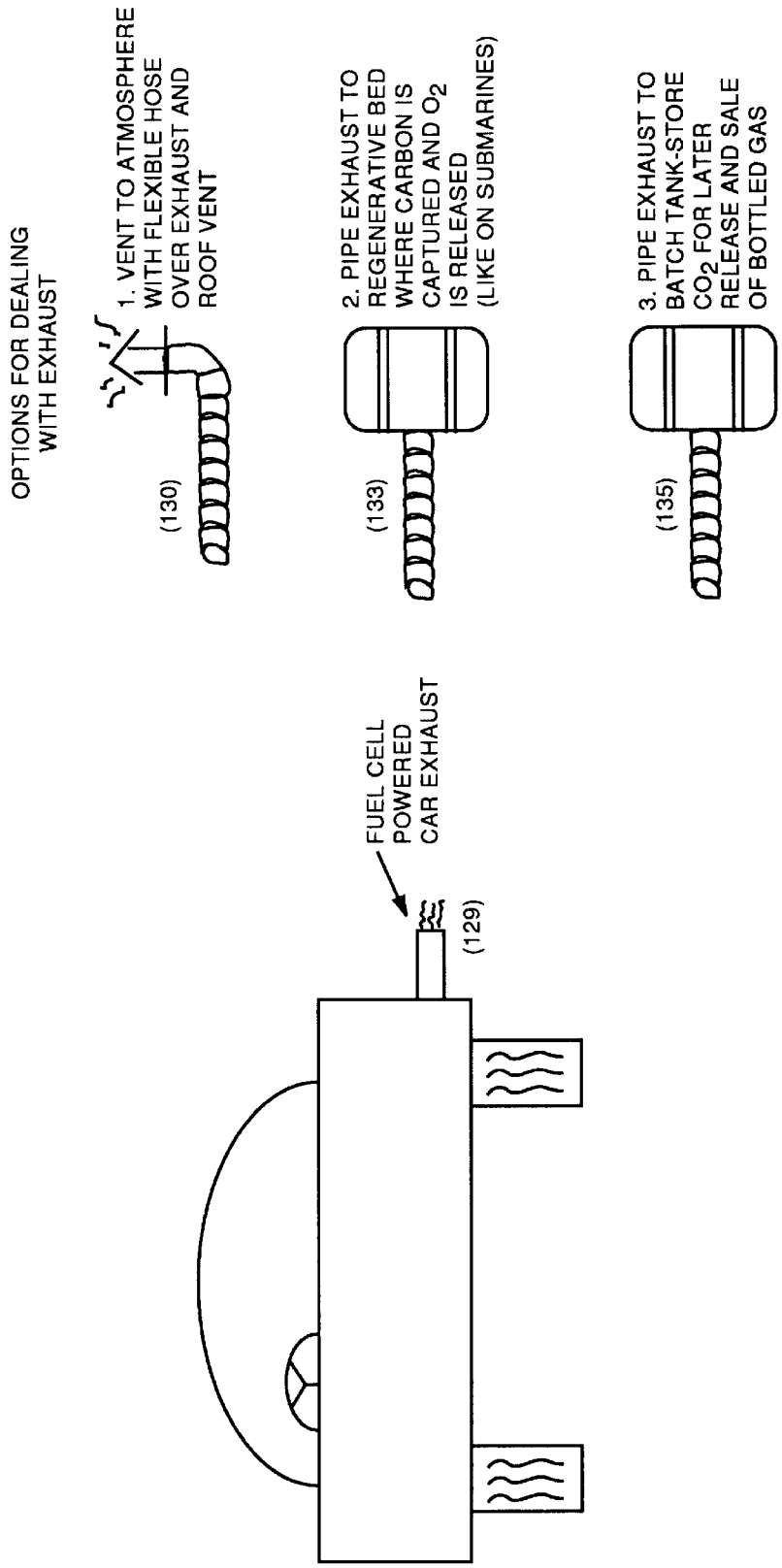

J. FIG. 9 shows options for dealing with the exhaust (129) from fuel cell powered vehicles, which will contain carbon dioxide.

Figure 9A:
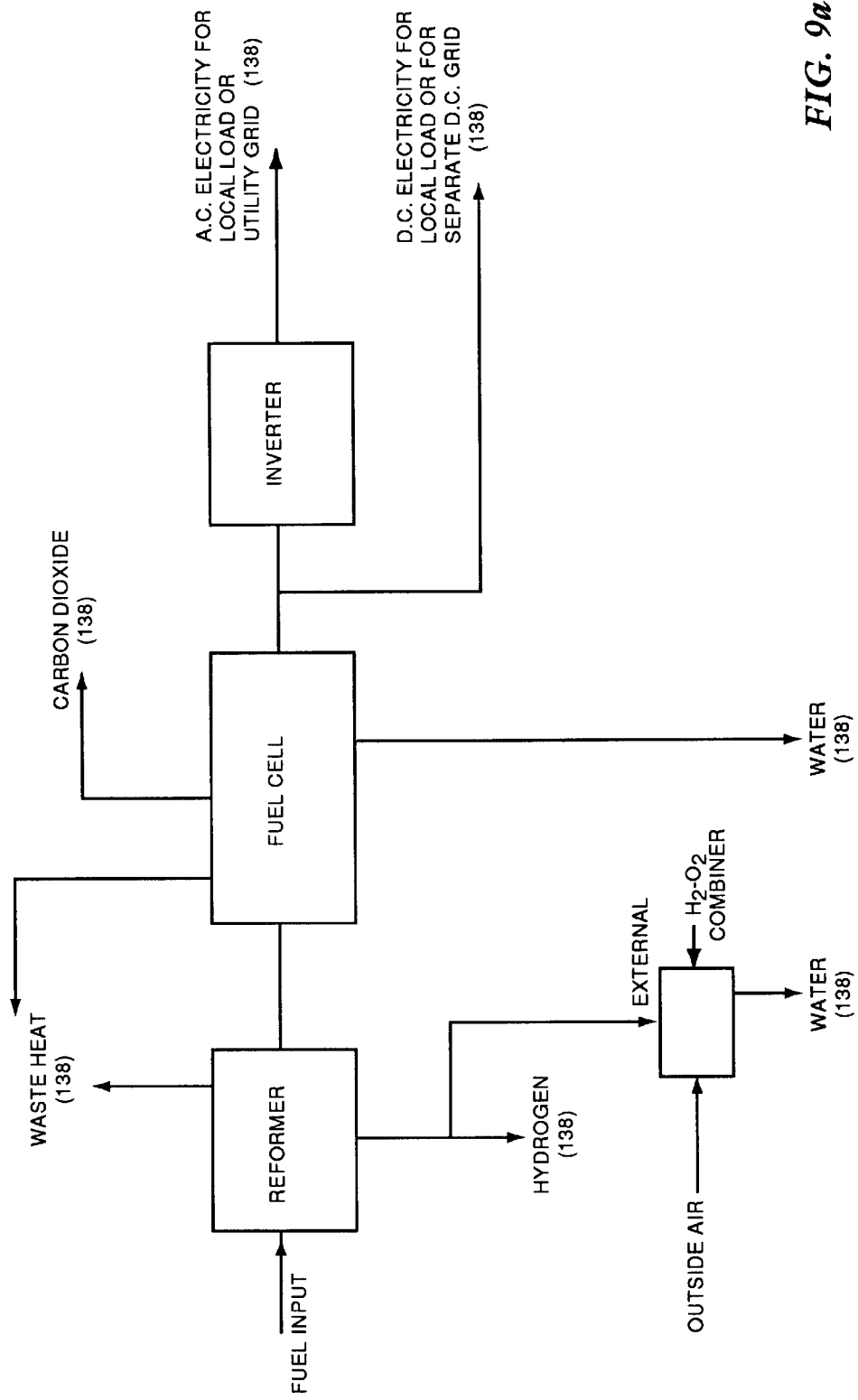

K. FIG. 9a illustrates the various output products (138) from a fuel cell powered vehicle that could be used in residential, commercial, or industrial applications and processes.

Figure 9B:
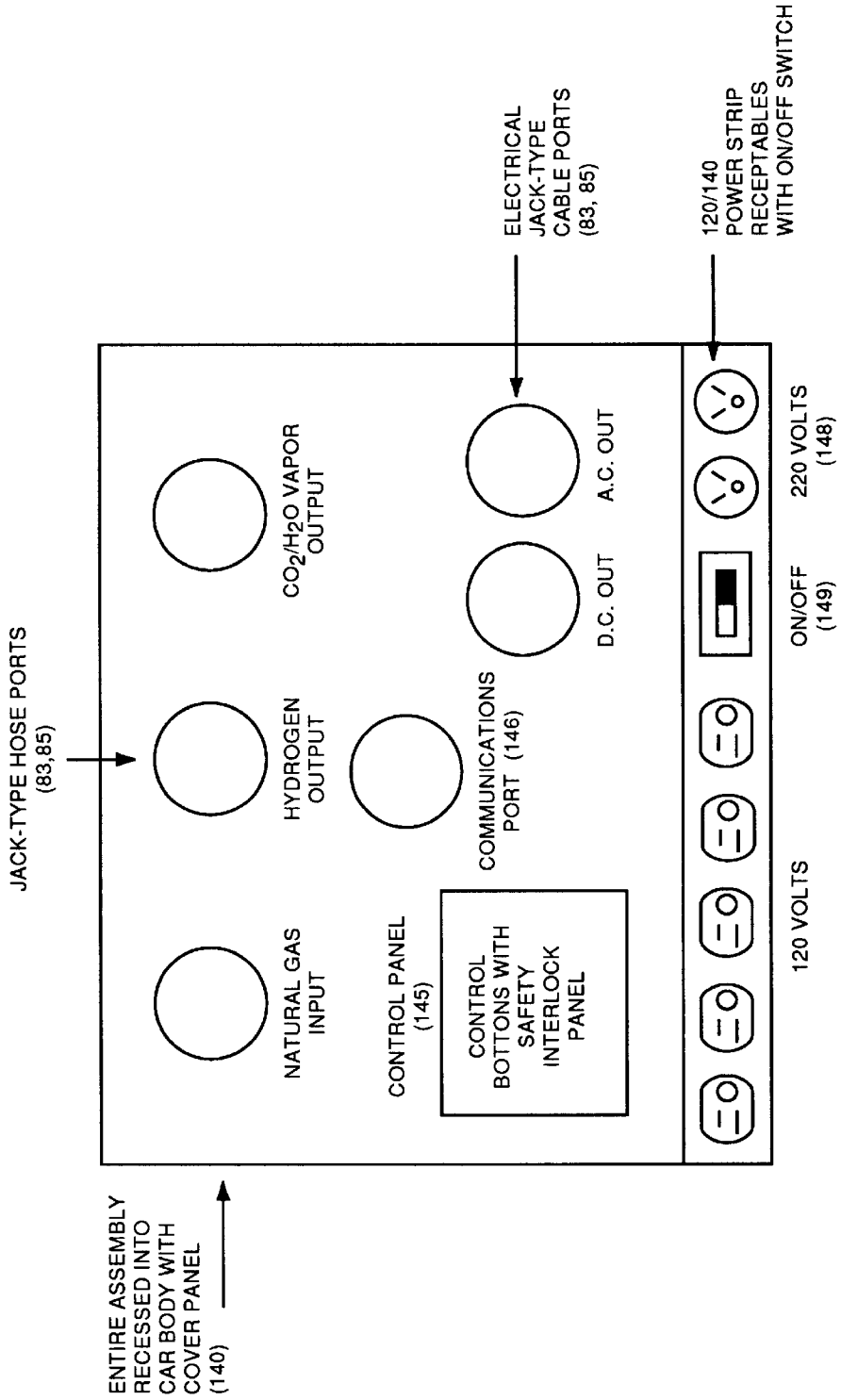

L. FIG. 9b shows a central input/output power takeoff station (140) that can be located on-board a fuel cell powered vehicle.

Figure 10:
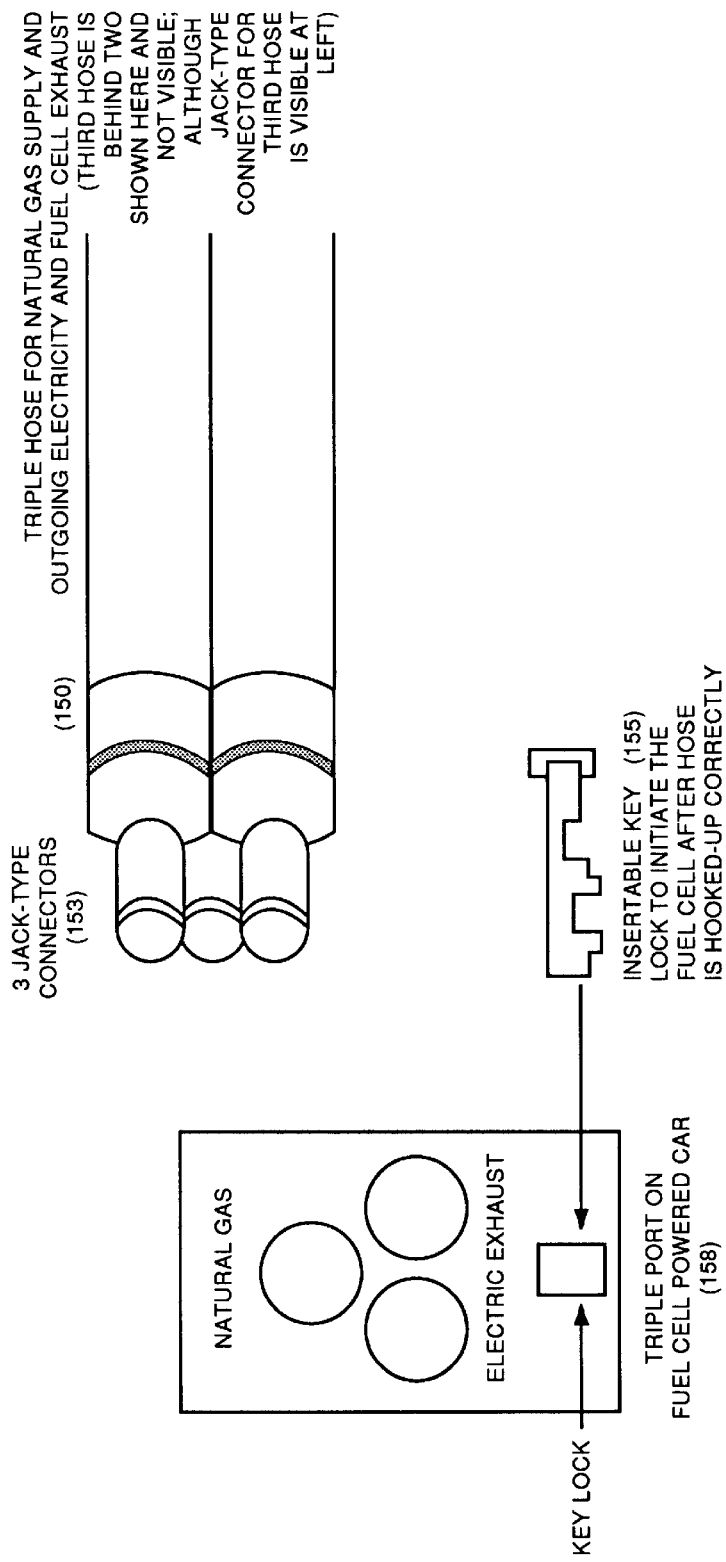

M. FIG. 10 shows a triple hose/cable design (150) and jack-type connectors (153) for a fuel cell powered car interfaced to the electric utility system.

Figure 11:
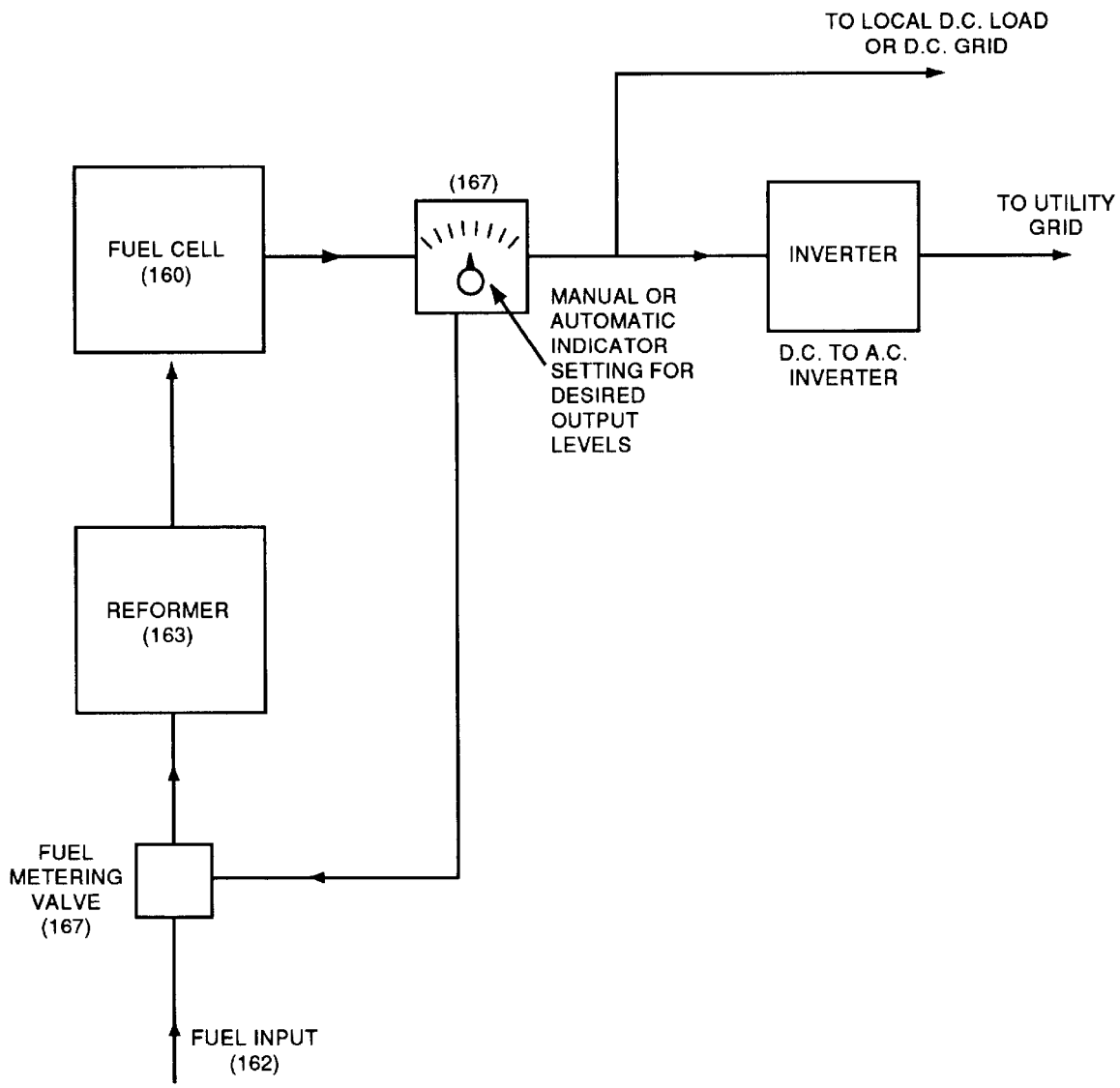

N. FIG. 11 shows a way to limit the electric power output of the fuel cell (160) by varying the flow of fuel (162) to the reformer (163) section of the fuel cell.

Figure 12:
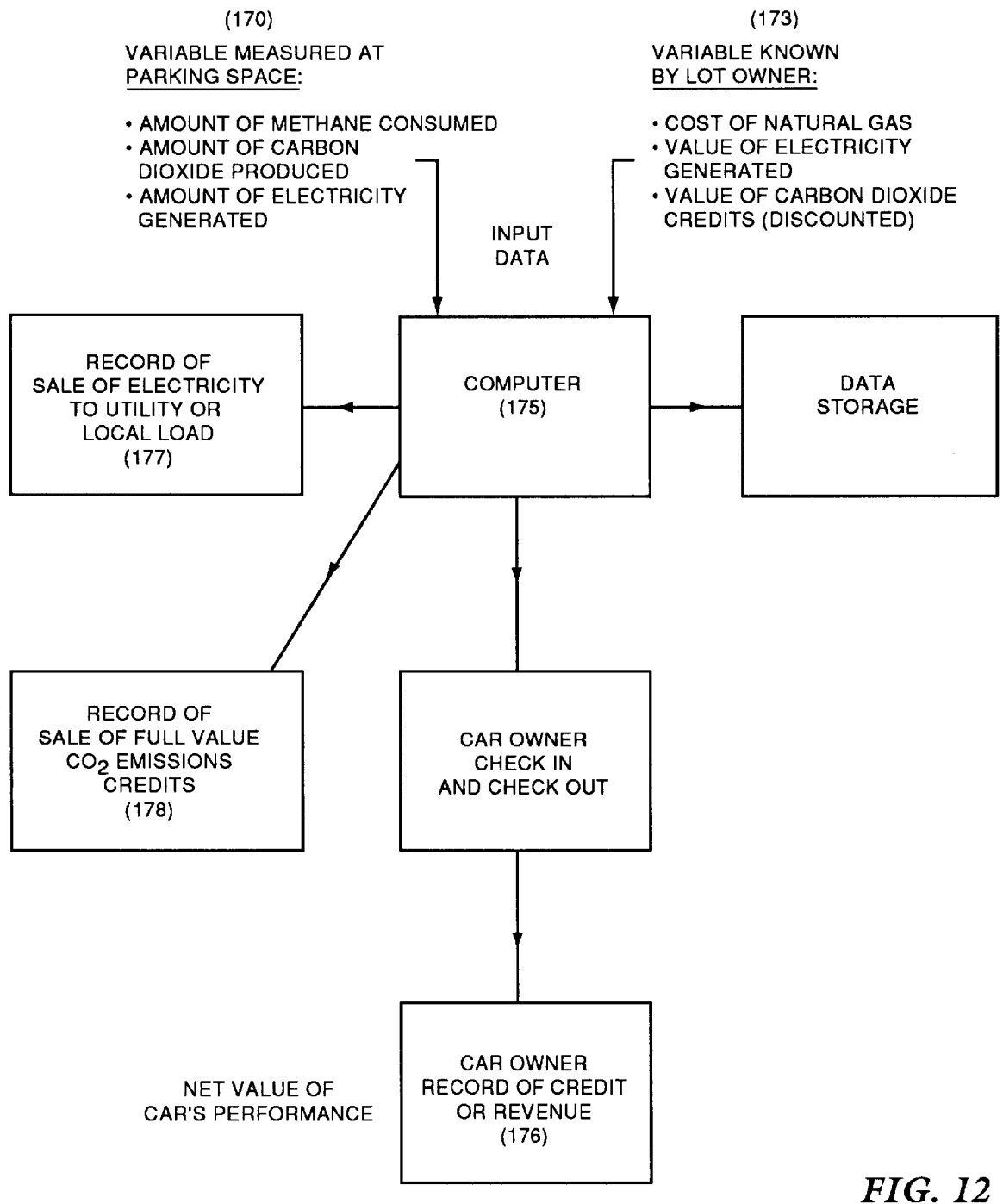

O. FIG. 12 shows the system for recording information by a parking lot owner which is used to compute the value of electricity generated by a fuel cell powered car.

Figure 13:
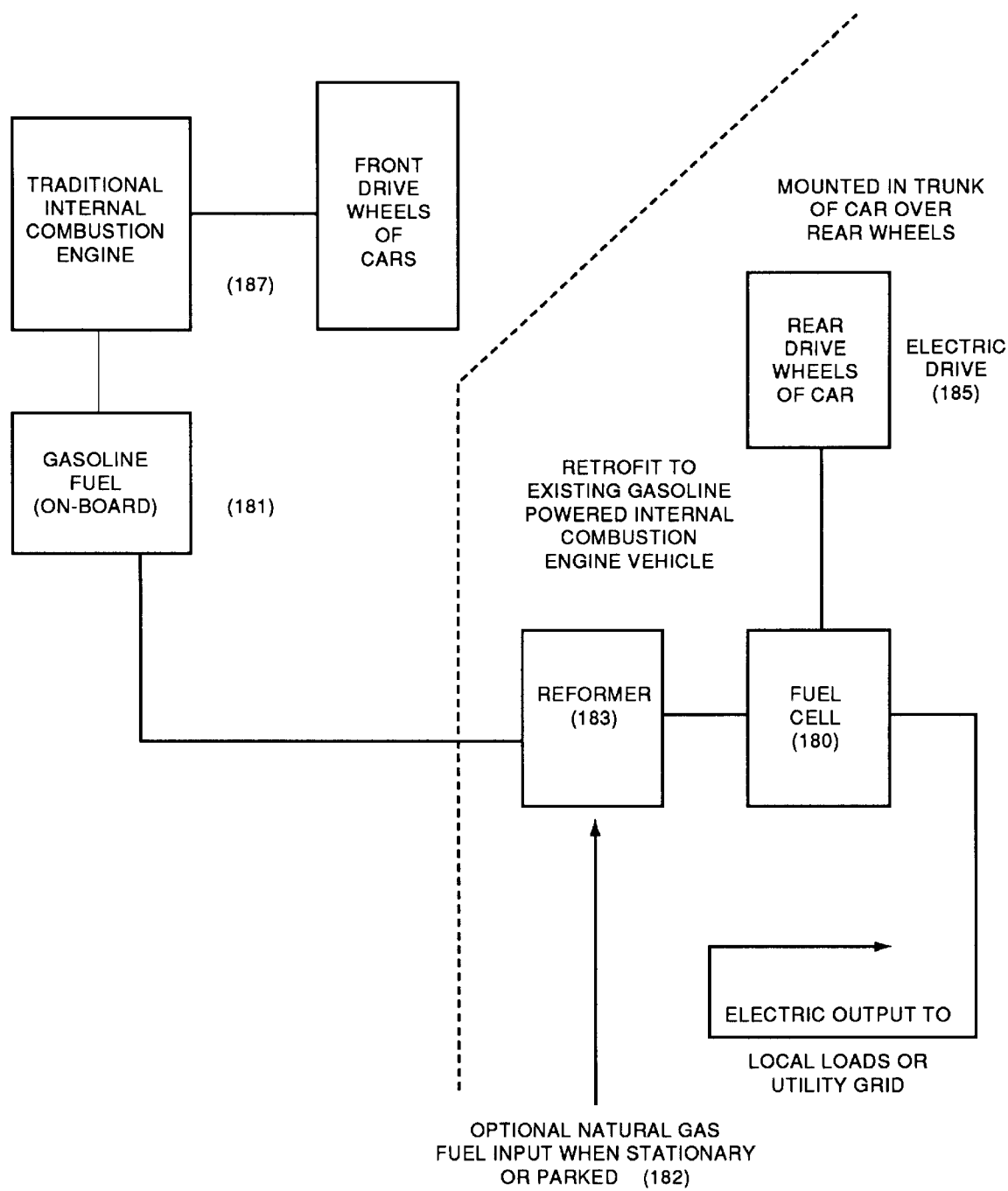

P. FIG. 13 shows the conversion of an existing gasoline powered car to a fuel cell powered car.

Figure 14:
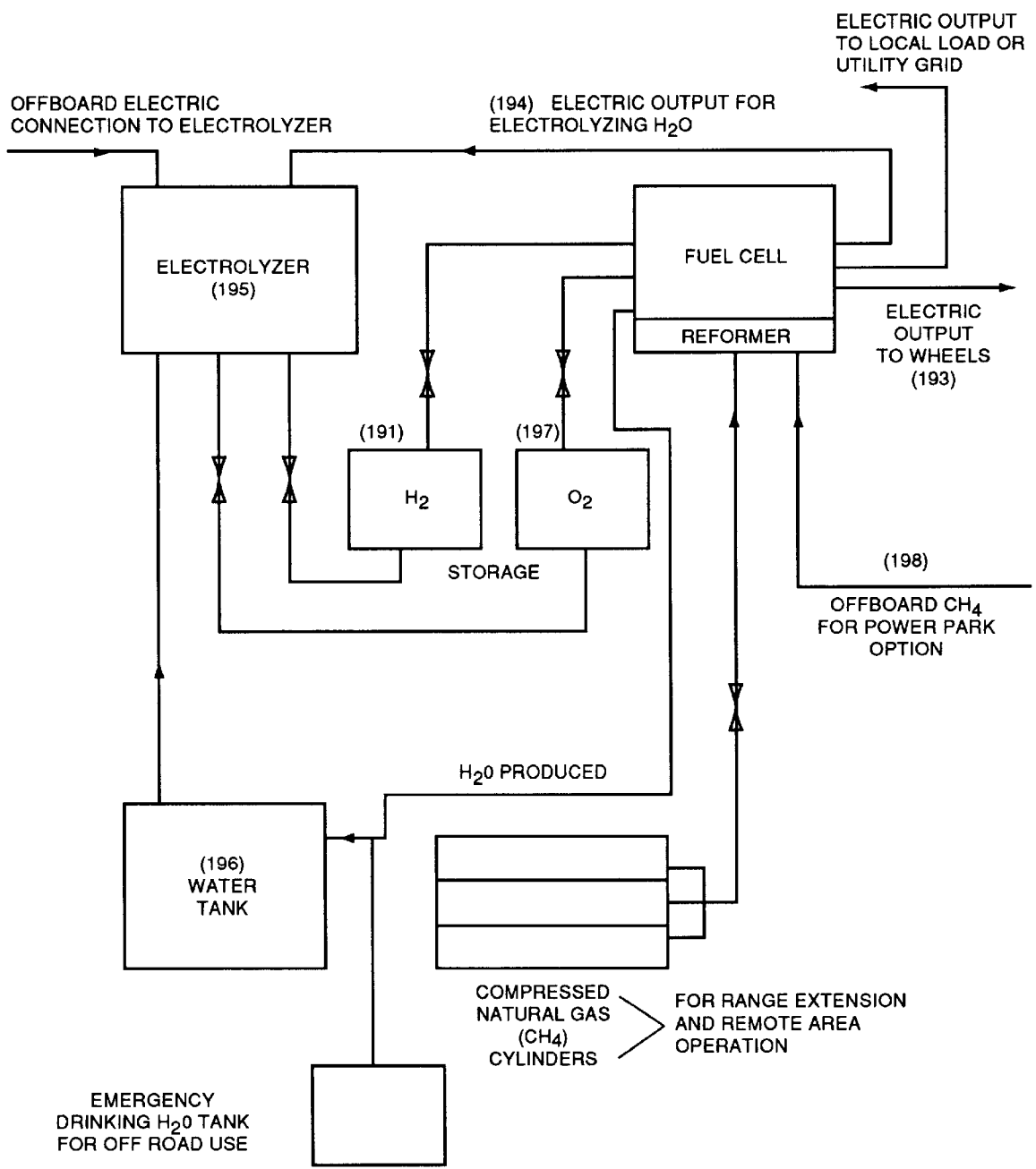

Q. FIG. 14 presents a water-natural gas hybrid vehicle for clean long range and urban driving.

Figure 15:
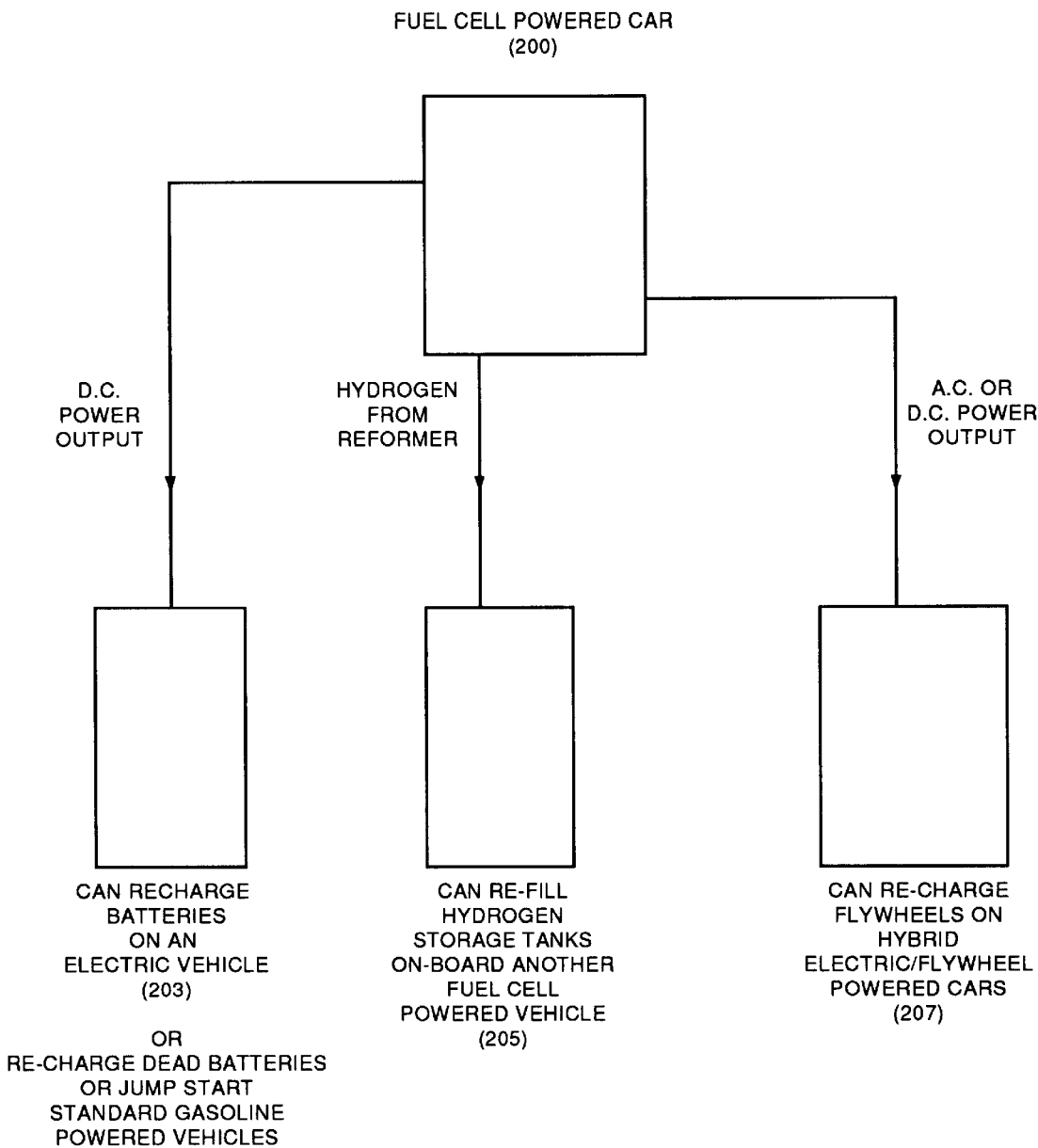

R. FIG. 15 shows how the fuel cell powered car (200) can interact with other standard and hybrid cars now making their appearance in the marketplace.

Figure 16:
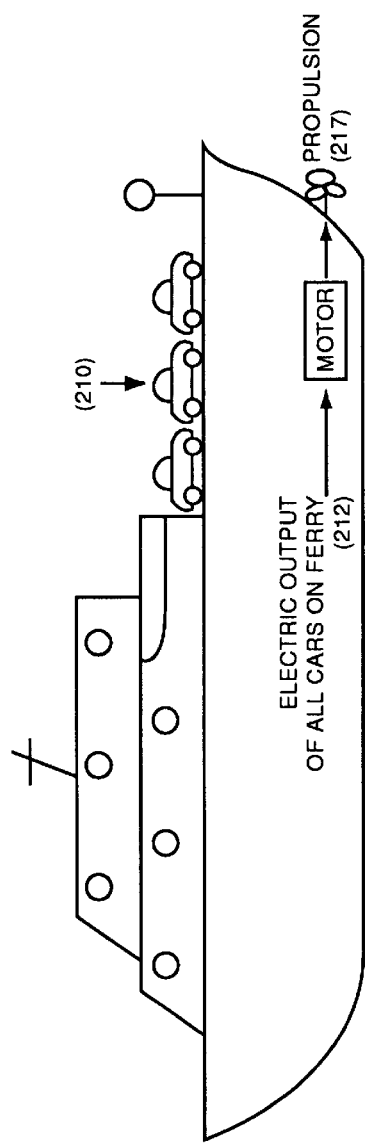

S. FIG. 16 shows the use of fuel cell powered cars as the prime motive source for automobile ferryboats.

Figure 17:
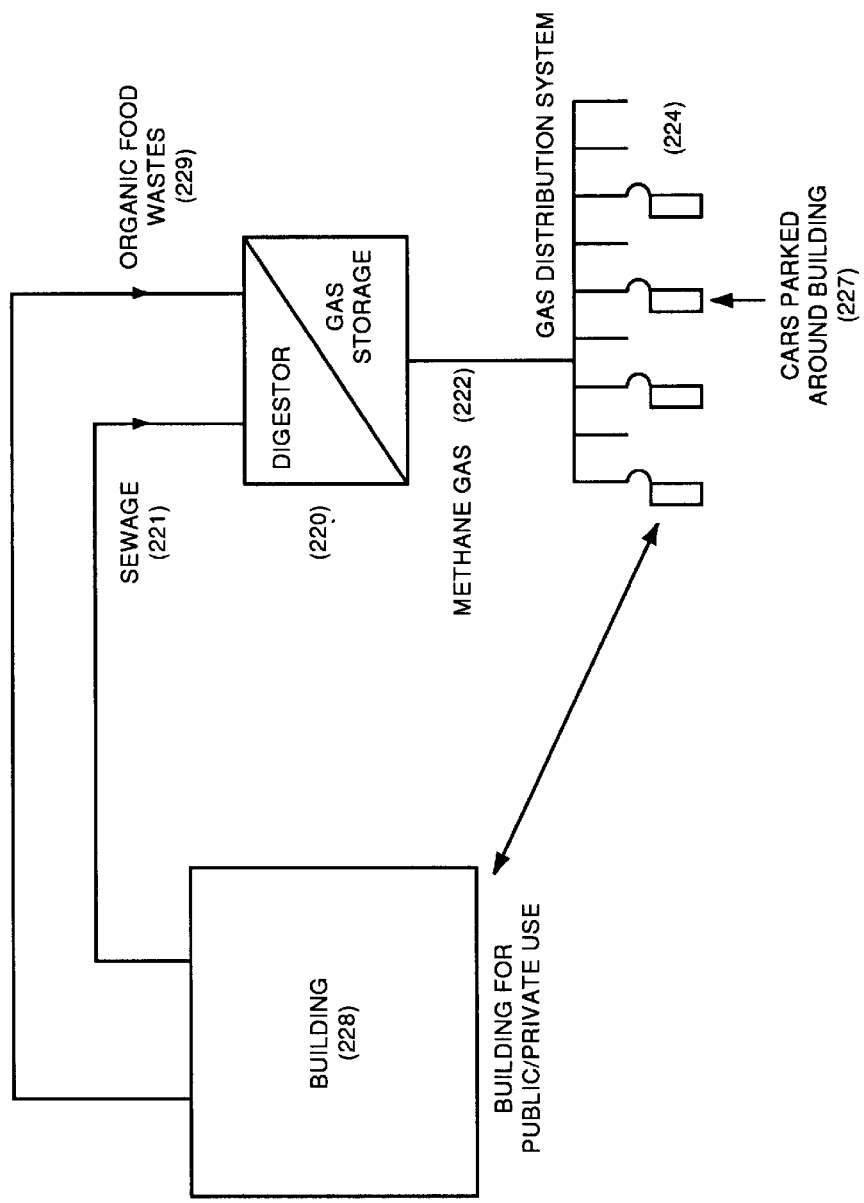

T. FIG. 17 shows how biogas from a biogas digester (220) could be used to supply methane gas (222) to fuel cell powered vehicles (224) which are parked around a building (228) for the purpose of generating electrical power (226).

Figure 18:
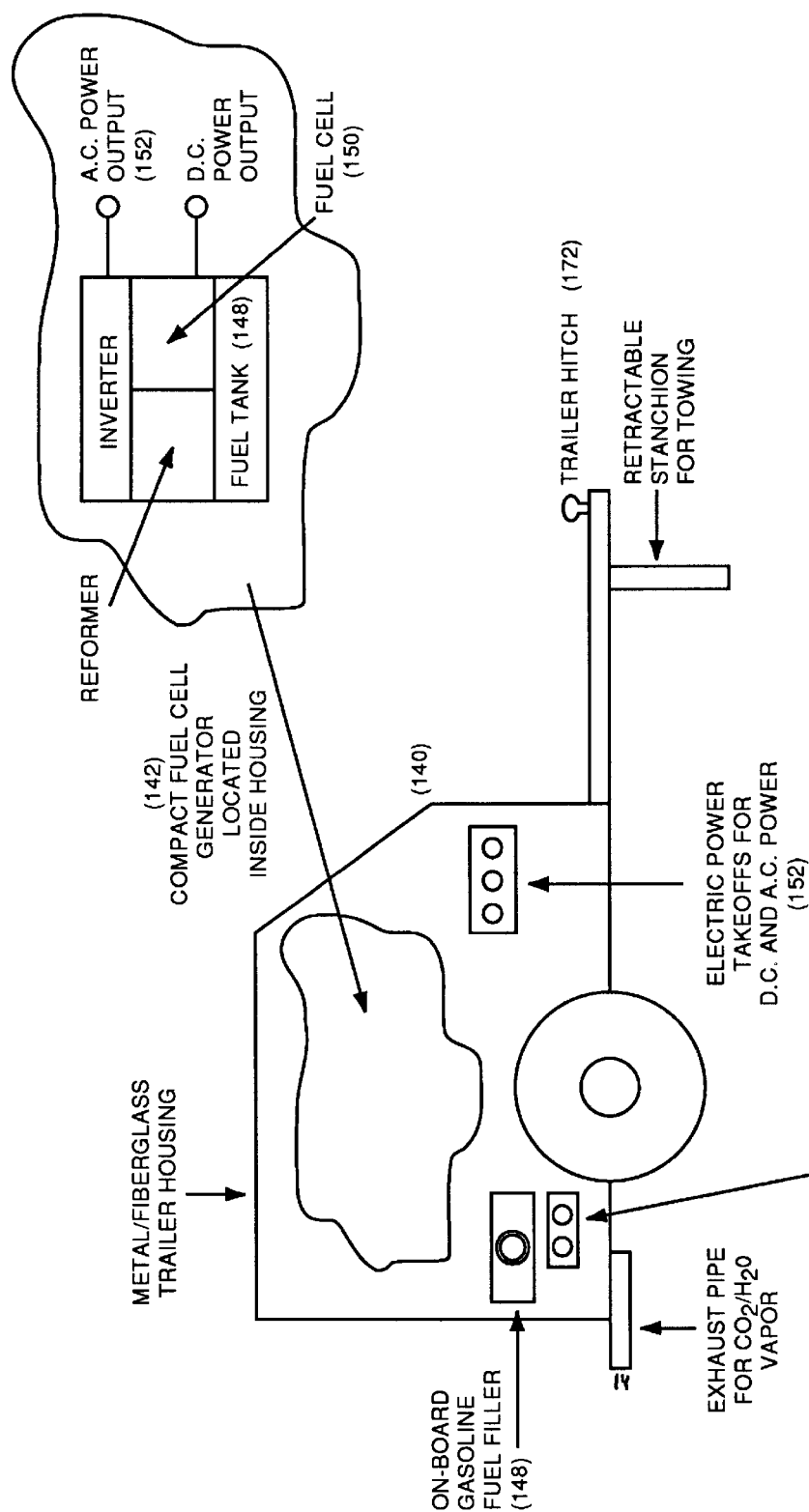

U. FIG. 18 shows a towable, two wheeled, portable, self-contained, fuel cell generator, with an on-board fuel supply (140).

Figure 18A:
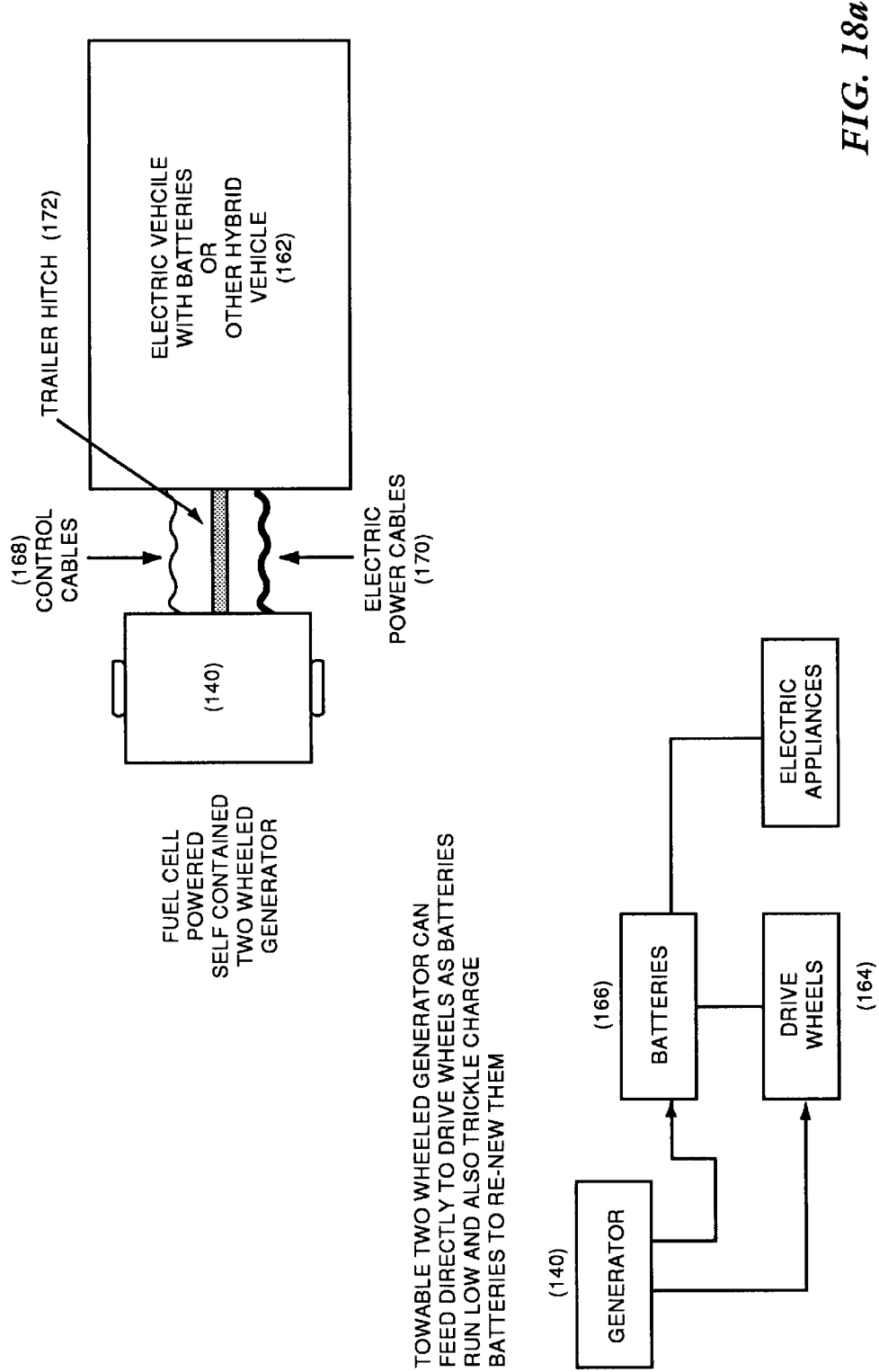

V. FIG. 18a shows this portable fuel cell powered generator (140) being used to increase the driving range of an electric/hybrid vehicle.

Figure 18B:
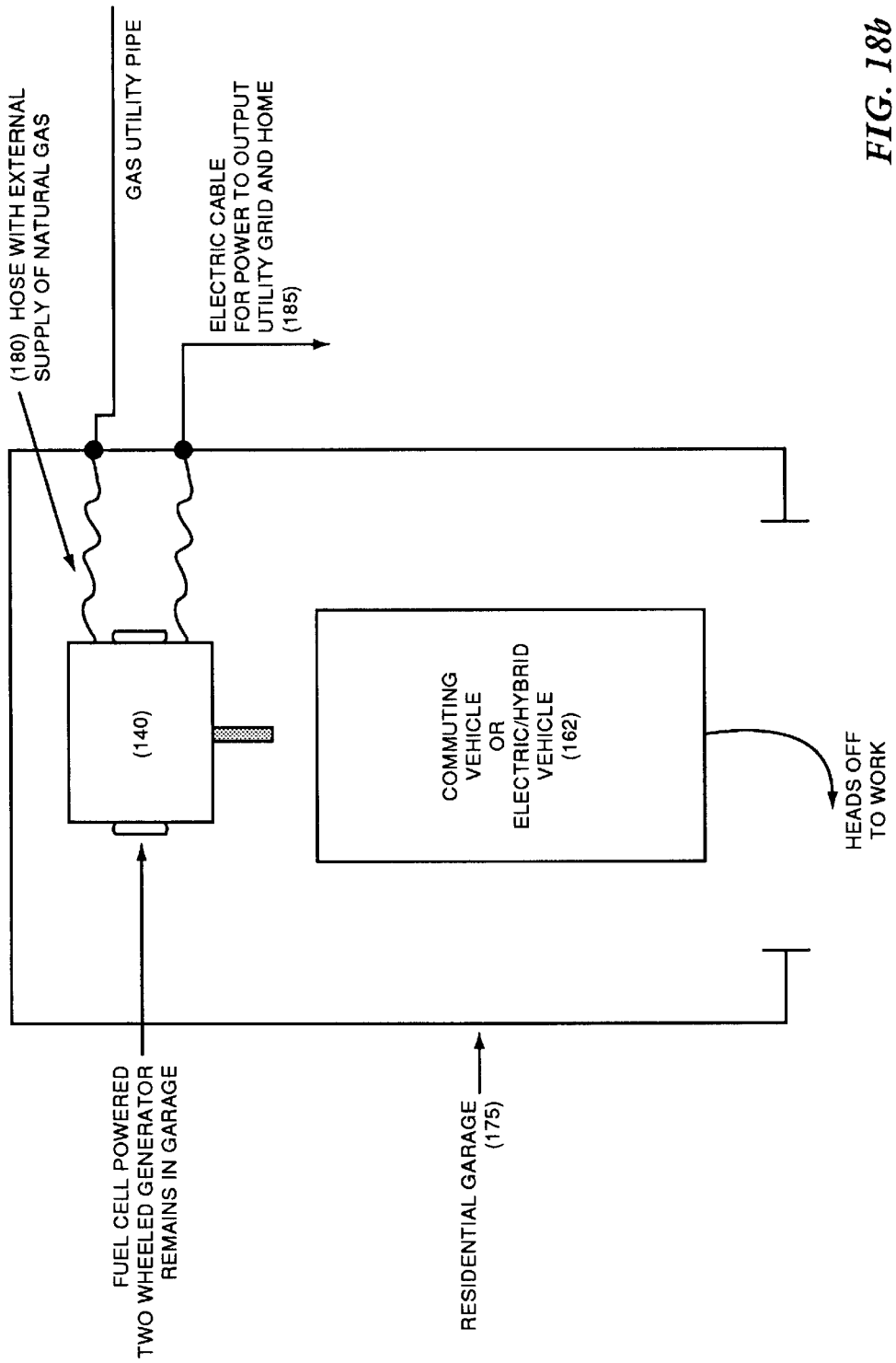

W. FIG. 18b illustrates how the towable fuel cell generator (140) can be unhooked from the vehicle (162) and left in the garage (175) of a home to provide on-site generation of electric power for the grid and home.

Figure 19:
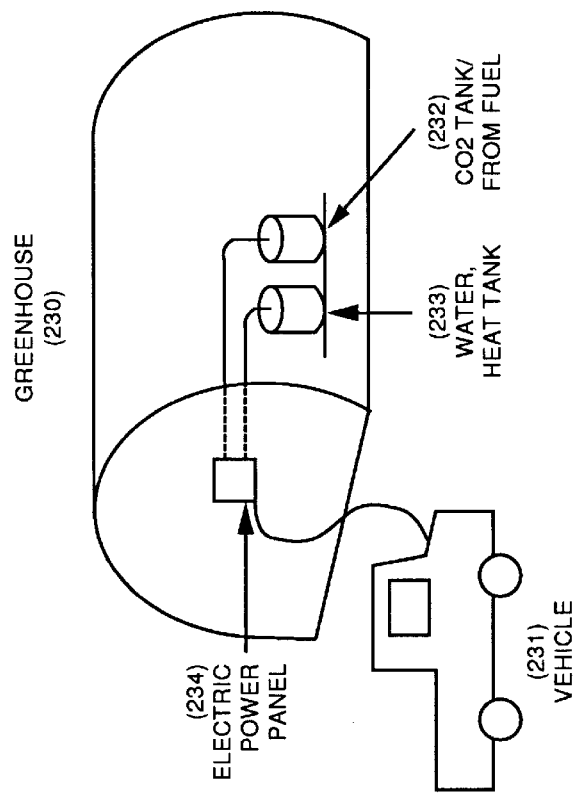

X. FIG. 19 illustrates how this invention and a fuel cell vehicle (231) can direct all of its outputs and byproducts to service a greenhouse 230).

Figure 20:
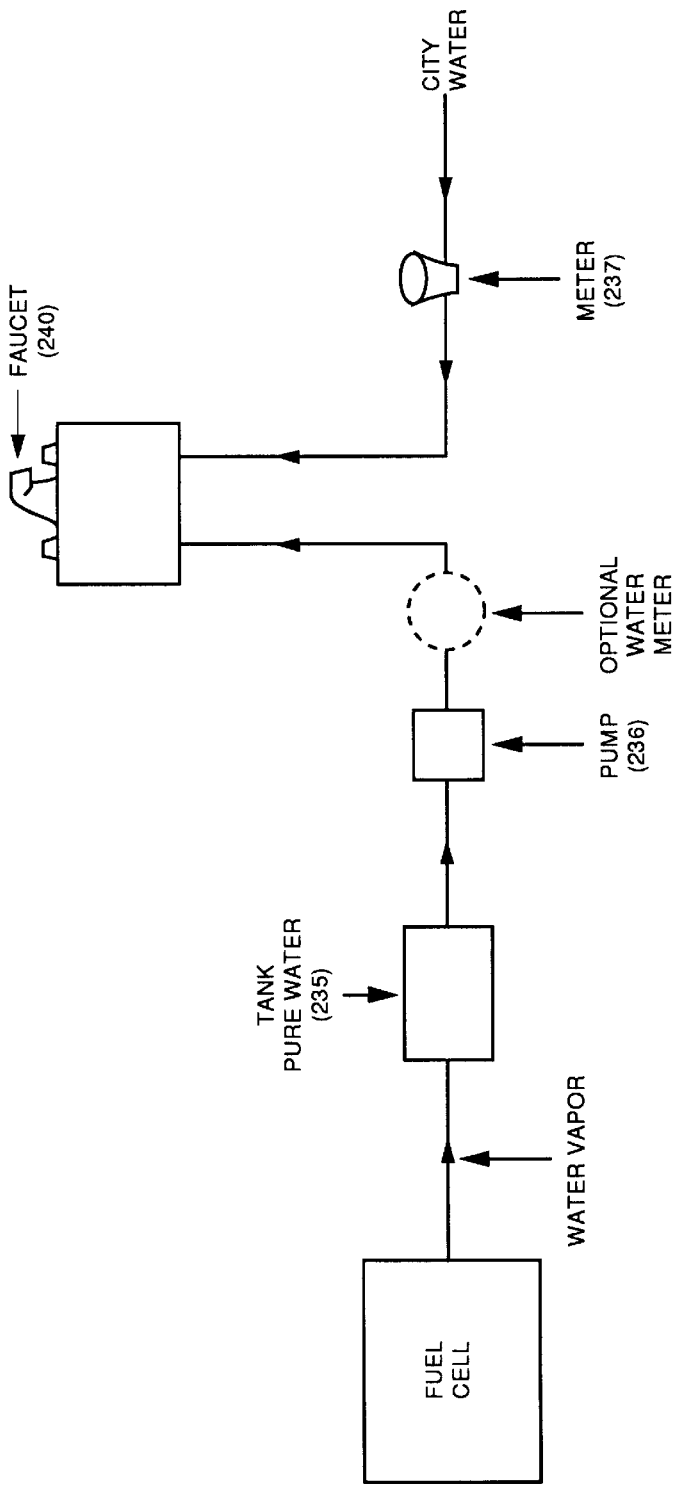

Y. FIG. 20 illustrates how this invention and the utilization of water produced from a fuel cell to provide useable and potable water.

Figure 21:
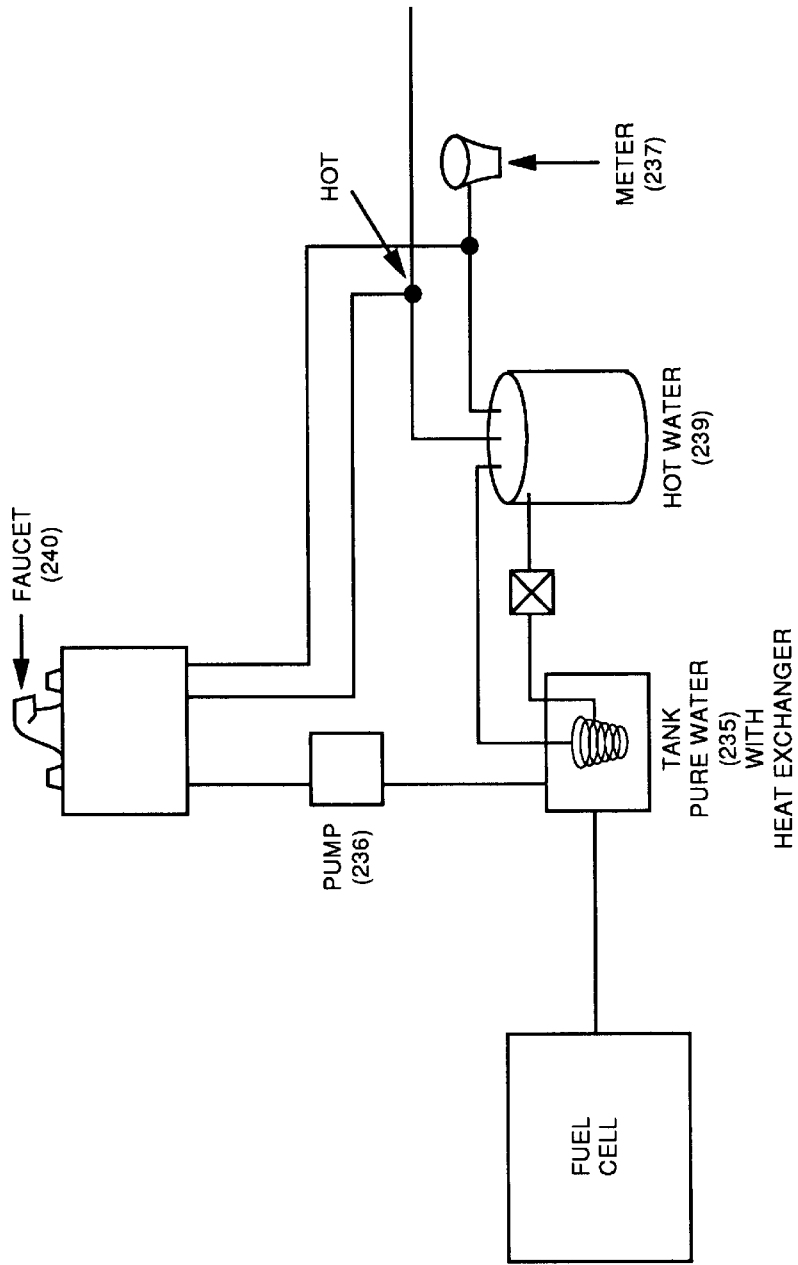

Z. FIG. 21 illustrates how this invention and the utilization of heated water produced from a fuel cell to provide domestic hot water and drinking water.

IV. SUMMARY OF THE INVENTION

This invention provides unique and novel methods, apparatus and processes to connect fuel cell powered cars to generate significant amounts of electrical power. This patent teaches more ways to employ the Power Park TM technology and builds on our prior invention. By example, a tandem connection is one method of connecting these vehicles. The unique viewpoint of a conventional parking lot as a dispersed generation site is the key strategic aspect of this invention.

There are other significant aspects of this invention including but not limited to the use of fuel cell powered cars to provide electrical power to large commercial/industrial buildings by using their employee parking lots as generation sites. Schools, shopping centers, new and used car lots, municipal parking lots, airport parking lots, commuter lots, park and ride stations, stadiums, movie theaters, hotels, restaurants, and hospitals can all become significant dispersed generation sites. This also makes it possible to use home garages and driveway parked cars as power sources for the residence. Fuel cell powered cars can be used to generate significant amounts of electric power wherever there is a parking lot or wherever the car is parked.

Parking for the purpose of this invention is defined as where one or more vehicles are parked or stored, such as but not limited to a parking lot, a marina, a dock, a driveway, a bus terminal, a garage, a truck terminal, or a train yard. The single vehicle being recognized by this invention as a novel and practical source of mobile power.

Although a car is mentioned in this invention, this invention clearly is applicable to all vehicles and for the purpose of this invention and claims, vehicle is defined as any vehicle, including, but not limited to, car, motorcycle, locomotive, motor scooter, bus, truck, locomotive, recreation vehicle, golf cart aircraft, submarine, trailer, boat, ship, or a train and other forms of tracked, wheeled or non wheeled transportation. A vehicle is also defined to include any source of power for a vehicle and may include but is not limited to, such as a heat engine, diesel engine, jet engine, micro turbine, aero-derivative type engines, a Stirling engine, fuel cell, an internal combustion engine, a gas turbine, a therm electric generator, a fly wheel, solar or photovoltaic system, a steam or vapor based engine, batteries, an electrolyzer, a fuel cell running in reverse to produce hydrogen or a vehicle that incorporates any combination of the above to include a hybrid vehicle. For the purposes of this invention and as used in the claims, vehicle is also defined to include a hybrid vehicle that incorporates any combination of the above sources of power. For the purpose of this invention, a fuel cell powered car is defined and extended to include other fuel cell powered vehicles.

The fuel cell is the preferred source of power. The process of our invention could be incorporated into internal combustion engine powered vehicles where emissions and cooling and other limitations discussed herein were taken into account in their redesign. The process of this invention could also apply to a stationary fuel cell or even a battery powered electric vehicle.

Our prior patent was recognized for the unique use of all byproducts of the fuel cell including its reformer, if used. The byproducts include carbon dioxide, water, heat and electricity. This patent recognizes and incorporates that the methods, processes, and apparatus necessary to utilize the fuel cell byproducts from the fuel cell vehicle are the same as will be utilized in a structure. Therefore the definition of vehicle as utilized in this patent and in the claims must include the fuel cell in a basement or other structure. A more near term alternative to the fuel cell, although not the most preferred embodiment of our invention, is the hybrid vehicle. But as technologies develop, the hybrid vehicle could gain an increasingly more important role.

A solar vehicle or residence could produce electricity to run an electrolzer or fuel cell running in reverse to produce hydrogen. Water would be fuel of choice and the hydrogen could be stored in a metal hydride alloy in the home or vehicle or cylinders or tanks. Solar is not near term but with more stress on the environment and technological improvements, it could be closer than envisioned. A vehicle, as defined herein, is also one that produces a significant amount of energy and converts it to a form that can be directed to an off board load or structure. It is the preferred embodiment that such energy be in the form of electrical energy.

When applying the present invention to a residential building, it should be understood that the electrical receptacles would typically be in the garage or adjacent to it. The electric power collection grid would typically be the wiring system connected to the electrical receptacles. The electric power collection station would typically be a junction box which connects all of the electrical receptacles. The investors would be inside or outside the building, and typically would have two lines, one connected to the building and one to the utility grid. Alternatively, the invertors could be in the vehicle and supply A.C. electrical power to the electrical receptacles.

An additional application of the present invention to a residential building, could be independent of the utility grid. This application of the invention could be in remote locations, suburbia, or areas without an electric infrastructure as an example.

A form of vehicle envisioned by this patent and incorporated in our definition herein is the trailer. This patent includes a novel and unique self propelled trailer which can also carry its own onboard generator. Although, the trailer is depicted in FIGS. 18, 18a, and 18b, as a two wheeled trailer, this patent is not limited to the two wheeled Power Mule™, and this patent envisions and incorporates that future trailers, to include the 18 wheeled truck and trailer variety will be Power Park™ vehicles and some portion or all the trailer wheels may be individually powered. This unique invention incorporates the 8 wheeled trailer as either a self powered trailer with the trailer carrying a generator and powering the vehicle drive motors and or its own drive motors. The trailer can user power from the truck or Power Park™ vehicle to drive the wheels having motor drives.

By example, campers are now limited by the tongue weight and towing capacity of their vehicles. The stress on the towing or pulling vehicles is significant. This invention would allow for smaller vehicles to tow larger loads, or vehicles with smaller drive engines to pull relatively larger loads. However, our invention, our trailer the Power Stream™ could easily follow behind a Power Park™ vehicle with electricity from the vehicle powering the load, or drive motors of the campers wheels. Additionally, the trailer could also carry its own fuel cell or other form of generator as envisioned by our Power Mule™.

V. PREFERRED EMBODIMENT OF THE INVENTION

In the text which follows below, the preferred embodiments are represented in a number of diagrams providing a variety of ways to connect and utilize the electrical and non electrical output of the vehicles will be described. These applications span the gamut from residential to commercial and industrial uses.

A. FIG. 1 shows the general power generation mode for the fuel cell vehicle.

Off board hydrocarbon fuel (5) is supplied to the reformer (10) which strips off the hydrogen and uses it as an input to the fuel cell (15). The power generated can then be used for either motive power for the vehicle or fed back into the utility grid, or load. This choice is facilitated by the dual mode switch-a manual switch (20) which directs the power either to an internal electrical bus (25) for the purposes of powering the drive wheels and accessories of the vehicle itself, or for the stationary generation of power (30) and its consequent interface to the utility grid.

The interface to the grid could involve the use of an on-board D.C. to A.C. inverter (35), or the power could be inverted off-board (40), so as to match A.C. power with that of the grid.

The output of the fuel cell could also be used directly as D.C. power either to supply a D.C. load or a D.C. grid (45).

Additionally, the fuel cell (15) can be modular and/or may have a modular component that can be removed from the vehicle to power a home, provide emergency power, provide sustained power at the modular level, or provide power to any load. Quick connectors could be utilized for the modular fuel cell, for the port in which it would reside. This patent teaches the hook up arrangements for the fuel cell which are applicable both to the vehicular and stationary applications. This is whether the stationary application is permanent or "plug and play".

B. FIG. 2 illustrates the interfacing of the output of the fuel cell powered car's output to the utility electric system.

Once the inverted power from the car is ready to interface to the electric utility (50), it must pass through a metering arrangement as shown-with the standard meter (53) into the customer building recording flow in one direction and the meter (55) for the fuel cell powered car registering electric power flow in the opposite direction. The net difference between these two meters is the bill that the customer would be responsible for. It is possible that a single net effect electric meter could be used to meter simultaneously both flow into the building and flow out of the fuel cell powered car inverter.

Exiting the meters, the generated power would pass through protective electrical relaying (57) that would be required to interface with the larger electric utility (60). Such equipment is now in use with alternate power generation systems like that for photovoltaic, wind, and micro hydro powerplants that have been connected to the national grid over the last 20 years. This protective relaying working in conjunction with the customer's D.C. to A.C. inverter would shut the inverter down when loss of electric utility system voltage is detected (or excessive electrical current is sensed heading from the utility system into the customer's inverter). With loss of utility system voltage, this is especially important since it would be undesirable to have the customer feeding power into a utility circuit that is out of service due to damage or for maintenance purposes. This would back-feed the circuit and be dangerous for utility line personnel working on the circuit. The D.C. output of the fuel cell may also be used to supply a local D.C. load, or fed into a separate D.C. grid (65).

C. FIG. 2a shows how the D.C. output (70) of the fuel cell powered car can be used.

This diagram presents some possible typical D.C. applications (73), and is meant to point out the versatility of the D.C. portion of the vehicle's output. The listed D.C. applications below are meant to be representative and not an exhaustive list of all possible such applications and include, battery charging, remote or camping use, industrial factory sites, agriculture, emergency lighting, telephone service, military, locomotives, subways, trolleys, electric welding, etc.

Since telephones are basically D.C. powered devices, fuel cell powered cars could become the primary or emergency source of power for a hard-wired telephone system. Telephone company employees vehicles parked at their place of work could provide power for the telephone service (75) in their local area during the day. Then at the end of the day when the telephone company employees returned with the telephone companies Power Park™ vehicles, the power from these telephone company vehicles could be used or stored by the telephone companies in the evening when the employees return to their homes. At their homes, the telephone company personnel could utilize their Power Park™ vehicles to power their own homes or even sell the power to the telephone company or utility. Similarly, this invention can also address the energy needs for the cable companies whose failures due to loss of energy (loss of Cable TV) are more visible than those failures due to loss of energy of their rival, the telephone company.

D. FIG. 3 shows how the fuel cell powered car would receive natural gas and generate electricity while parked in a multi-level parking structure.

Overhead supplies of piped natural gas (80) accessible from coiled flexible hoses (81) would make it possible to snap jack-type connectors (83) into recessed fuel access ports (85) located on the top, side, front, rear, or bottom of the vehicle. The natural gas connection could make use of currently available technology like that embodied in The Sturgis Gas Convenience Outlet system which uses a positive disconnect manual shut-off valve to start or stop gas flow. The Sturgis system is now used for household appliances like clothes dryers, space heaters, water heaters, and cooking ranges.

Overhead supplies of piped natural gas (80) accessible from coiled flexible hoses (81) would make it possible to snap jack-type connectors (83) into recessed fuel access ports (85) located on the top, side, front, rear, or bottom of the vehicle. The natural gas connection could make use of currently available technology like that embodied in The Sturgis Gas Convenience Outlet system which uses a positive disconnect manual shut-off valve to start or stop gas flow to the vehicle. The Sturgis system is now available to natural gas consumers for common household appliances like grills, clothes dryers, space heaters, water heaters, ranges, garage and patio heaters, and portable gas emergency generators. Other commercially available, and safety qualified technologies similar in design to The Sturgis Gas Convenience Outlet system could also be employed.

Likewise, the generated electricity from the vehicle could also be connected to an overhead electric cable (87) using a jack-type (83) connection on the vehicle.

This patent also envisions the vehicle being automatically docked to ground level natural gas and electrical outlets when parked in a parking space, thereby automatically engaging natural gas and electrical hook-up. This could be accomplished via docking facilities on the front, rear, or bottom of the vehicle.

E. FIG. 4 presents a design for parking space islands (89) that would support fuel cell powered cars (91).

Natural gas and electrical output circuits would be built into the concrete structures (90), and fed from underground pipes and cables (92). Hose reels (94) at each parking space would provide for the connection (83, 85) of the fuel cell powered cars to the parking lot fuel and electrical network. Alternate construction materials to concrete could include but not be limited to steel, aluminum, recycled structural materials, plastic, rubber, wood, etc. These islands can be used in open parking lots or in multi-story arrangements, with the islands being built in double or single car space containments.

F. FIG. 5 shows a plan layout of an outdoor parking lot with both single (96) and double car islands (97) in use.

The spatial layout of the cars as shown in FIGS. 4 and 5 are representative of traditional parking lot arrangements. Layouts that envision a central dispensing island with cars parked in circular fashion around the island is also possible. Or cars may cluster around islands in a grid or angled parking arrangement as well or any variation that proves to be geometrically advantageous.

G. FIG. 6 shows a combination gas and electric hose (100) for fuel cell powered vehicles.

This single line or hose would simultaneously supply natural gas (101) to the vehicle and return generated power (102) to the utility system. Dual jack-type connectors (103) with a dual recessed port (104) on the vehicle would facilitate connection to the vehicle. This combination hose could be dispensed in one of two ways:

1) The hose could be kept on a reel in the parking space and extended to connect to the vehicle; or,
2) The hose could be kept on a reel on the vehicle and extended from the vehicle to the parking space connection as needed.

For the purpose of this patent and as used in the claims, hoses and cables are lines and lines are also defined as rigid, flexible, hose, cable, pipe, arm, insulated (so as to transport heated water), pressurized and may include an electric cable as well as a docking port or facilities. This patent also envisions and incorporates that energy may be transmitted from the vehicles via an atypical line such as microwave or radio frequency (RF) and that energy may be transmitted as multiple forms, even multiple forms simultaneously. By example, energy could be superimposed or carried by or on a laser beam or RF transmission. The laser beam or line provides the ionized pathway or line for the energy to be transmitted from the vehicle.

H. FIG. 7 expresses the option of using an on-board gasoline supply (110) of a fuel cell powered vehicle to generate electrical power while parked.

Here the reformer (112) is designed to process gasoline, instead of natural gas, and an electric fuel pump (114) feeds the gasoline to the reformer. A special "¼ full" fuel tank cut-off switch would be installed in the gasoline tank, so the tank is not accidentally drained dry, thereby leaving the vehicle stuck in the parking space.

The electrical connection (83, 85) of this gasoline powered fuel cell vehicle would be similar to that for the natural gas powered vehicle as previously discussed and illustrated.

Fuel cell powered vehicles may also use other gaseous or liquid hydrocarbon bearing fuels such as but not limited to natural gas, gasoline, kerosene, diesel, methanol, ethanol, alcohol, gasohol, pure hydrogen, propane, biogas derived fuels, plant derived fuels vegetable oils, mineral oils, water and all other solar derived fuels.

I. FIG. 8 shows the use of a transfer switch (120) for connecting a fuel cell powered car to the building electrical system (123).

In the event that the utility electric service to the building experiences frequent and/or prolonged outages, a manual or automatically initiated transfer switch (120) maybe used to disconnect (125) the normal utility supply and feed directly into the building load center, breaker panel box, or fuse box.

Transfer switches are commercially available and are for use with small emergency portable power generators in places where power is often interrupted for extended periods due to sever weather conditions.

J. FIG. 9 shows options for dealing with the exhaust (129) from fuel cell powered vehicles, which will contain carbon dioxide.

The first option is venting (130) the exhaust through a hose connecting the exhaust pipe to a roof vent. This is the likely case for small enclosures like a home garage and multiple story parking decks that are not adequately ventilated. In this instance, a hose collection system to a main roof vent would be necessitated.

This invention incorporates that the exhaust could be piped to a carbon dioxide and oxygen is released, similar regenerative bed (133) where carbon is stripped from the to what is done on submarines and in re-breathing apparatus. Here again, a hose collection system is needed to serve multiple cars.

This invention incorporates a unique and innovate method of utilizing all the output and by products from a vehicle including the use of the exhaust. The exhaust could be piped to a water storage system (135) where the carbon dioxide is stored under pressure, later to be released, cleaned, and used in a commercial or industrial process.

An example of our invention using the carbon dioxide output of a fuel cell powered car for a commercial process would be to locate the fuel cell powered cars in parking lots adjacent to a greenhouse complex and supplying all the electricity needed to run the facility, providing the electricity for lighting and cooling and providing carbon dioxide for increased plant growth, and the water for direct irrigation of the crops being grown in the greenhouse, with the heated water also providing beat to the greenhouse Additionally, biogas from a digester located at the greenhouse could utilize residual plant material to make the biogas for a unique and environmentally sound closed loop greenhouse system.

K. FIG. 9a illustrates the various output products (138) from a fuel cell powered vehicle that could be used in residential, commercial, or industrial applications and processes.

L. FIG. 9b shows a central input/output power takeoff station (140) that can be located on-board a fuel cell powered vehicle.

This station could be recessed into the body of the vehicle and may be equipped with a cover panel to protect it from the elements. Jack-type hose connections (83, 85) would be available for the gaseous input and outputs of the vehicle. Similar jack-type cable connections for electrical outputs would also be available. A control panel (145) with safety interlocks and control buttons would be included to control input and output to and from the vehicle.

A 120/240 volt power strip (148) with receptacles and an on/off switch (149) capability would be available for the on-site use of power or for the operation of portable appliances or emergency power.

A communications port is provided as shown (146) and may be used to remotely monitor and control the status of the vehicle, turn the vehicle on and off as needed, dispatch the outputs of the vehicle to meet changing conditions, and to send diagnostic and monitoring signals to and from the vehicle.

M. FIG. 10 shows a triple hose/cable design (150) and jack-type connectors (153) for a fuel cell powered car interfaced to the electric utility system.

The natural gas hose section would supply fuel to the fuel cell. The electric cable would provide for the exit of electricity. And the exhaust hose/s would provide for the exit of exhaust gases such as carbon dioxide from the reformer plus trace pollutant gases, water and water vapor from the fuel cell.

In cases where the fuel cell is to be operated with-board supplies of gasoline, then the triple hose becomes a dual hose for the exit of electricity and exhaust gases.

A safety key lock (155) is envisioned as a way to initiate the intake of fuel and outflow of electricity and exhaust products once the triple hose (or double hose) is engaged in the port (158). The key can be made of plastic or metal like those safety keys in common use for power tools, lawn mowers, and other household appliances. This prevents the accidental initiation of the appliance, or in this case the fuel cell, without having the correct hose hook-up.

N. FIG. 11 shows a way to limit the electric power output of the fuel cell (160) by varying the flow of fuel (162) to the reformer (163) section of the fuel cell.

This would be used when the fuel cell powered car is parked and generating electrical power for the utility grid. This control mechanism (167) may be installed on the driver's panel inside the car or locally at the fuel input port on the outside of the vehicle. It may be necessary to limit the full electrical output of the fuel cell, especially in residential applications, and this mechanism should provide for that capability.

O. FIG. 12 shows the system for recording information by a parking lot owner which is used to compute the value of electricity generated by a fuel cell powered car.

Each fuel cell powered vehicle can generate valuable electricity which has an immediate market value. Also, because of the high conversion efficiency of the fuel cell itself, a fuel cell powered car is environmentally clean; and this high efficiency can also be expressed as an environmental credit which has an implied sale value to offset other low efficiency conventional utility generation sources. Thus the final value of a fuel cell powered vehicle to its owner (not including transportation) has two new components; its raw electricity generated savings and its emissions credit savings. Other owners will count water productions. While the most astute and environmentally minded owners will utilize all byproducts as this patent teaches.

Two primary segments of input data are used to compute the value of the electricity produced. The first piece of input data are the variables measured (170) at the parking space where a fuel cell vehicle is parked. The three variables are: the amount of methane consumed by the vehicle; the amount of carbon dioxide produced; and the amount of electricity generated. These variables are measured through metering devices installed by the parking lot owner at each parking space, with the information gathered and stored in a computer.

The second segment of input data are the variables (173) which are known by the parking lot owner and includes: the cost of natural gas purchased from a local natural gas distribution company and provided to each parking space; the time of day value of the electricity produced by each vehicle; and the discounted market credit value of the carbon dioxide generated from each parked car. This information is also stored in the computer.

As each fuel cell powered car enters and exits the parking lot, the computer (175) determines the value of having that car in the lot by an algorithm that combines the two pieces of input data discussed above and computes a credit or revenue value (176) for the owner when the car leaves the lot. The parking lot essentially pays the car owner for having parked the car there. The lot owner in turn sells the electricity generated (177) by all the cars as well as the total emissions credits (178) generated and thereby realizes its gross sales. Both the car owner and the parking lot owner become merchants of electric power and emissions credits.

P. FIG. 13 shows the conversion of an existing gasoline powered car to a fuel cell powered car.

With the popularity of a fuel cell powered car and its ability to generate revenue for its owner, it is reasonable to expect a large market for converting existing standard cars to Power Park™ fuel cell powered cars. The simplest way to do this could be to install a small fuel cell (180) and reformer (183) in the luggage compartment of the vehicle and let that fuel cell be powered from the on-board tank of gasoline (181). While the car is parked in a lot it could also be connected to an external supply of natural gas (182) at the parking lot. While this retrofitted fuel cell is not used to move the vehicle around, it certainly can generate electricity while parked with the fuel cell and the car owner can produce revenue.

A variation of this would to be again retrofit a fuel cell into the luggage compartment of the standard car and redesign the rear axle of the car to include electric drive motors (185) and have the fuel cell capable of driving the rear wheels; thus resulting in a hybrid car with traditional combustion engine driven front wheel drive (187) and fuel cell driven rear wheels (185). The front wheel drive is used for suburban/highway driving, and the very clean fuel cell rear wheel drive is used in heavily polluted inner city areas. Such a hybrid vehicle would be able to achieve badly needed clean air emissions in the city and while parked also achieve very clean, environmentally benign electric power generation.

Q. FIG. 14 presents a water-natural gas hybrid vehicle for clean long range and urban driving.

This fuel cell powered vehicle uses natural gas fuel (190) for long range driving and clean hydrogen fuel (191) for inner city operation. On-board natural gas fuel stored in tanks (190) propels the vehicle using the electricity generated by the fuel cell to drive the wheels of the vehicle (193). Some of the electricity (194) produced during driving is used to electrolyze (195) on-board supplies of water (196) to make hydrogen and oxygen (191, 197) for storage and later use when the car enters urban areas and the switch to the cleaner burning hydrogen fuel can be made. Once the car is parked, it can be hooked to an off-board supply of natural gas (198) and the vehicle can be used to generated clean electricity for the utility grid.

The car can also use its on-board supply of natural gas to generate electricity if that is desired. And the on-board storage tanks can also be recharged while the vehicle is parked in a parking lot if that is desired by the car owner.

R. FIG. 15 shows how the fuel cell powered car (200) can interact with other standard and hybrid cars now making their appearance in the marketplace.

The D.C. electrical output from a fuel cell powered car could be used to re-charge the batteries (203) of a typical electric vehicle. Or this output could be used to re-charge the car battery of a standard internal combustion vehicle or give it a jump-start if needed.

Hydrogen generated by an on-board fuel reformer in a fuel cell powered vehicle could be used to re-fill the hydrogen storage tanks (205) of a fuel cell powered vehicle that uses stored hydrogen for its main propulsion fuel.

The A.C. or D.C. power output of a fuel cell powered car can be used to re-charge the flywheel (207) of a hybrid electric-flywheel powered car.

This figure is meant to show the versatility of the outputs from a fuel cell powered vehicle with existing and likely new hybrid vehicles appearing on the highways. It is representative and not an exhaustive review of all the possible ways that fuel cell powered cars can be utilized.

S. FIG. 16 shows the use of fuel cell powered cars as the prime motive source for automobile ferryboats.

Since a ferryboat for automobiles is just a moving or floating parking lot, the designs discussed earlier for gathering the electrical output from vehicles (210) parked in a parking lot also apply here as well. The combined output (212) of all the vehicles could be used to power the ships motor or motors (215) which in turns propels (217) the ferryboat through the water.

The ferryboat could be equipped with its own on-board supply of natural gas for the parked vehicles to use, or the parked cars could use their own on-board supplies of hydrocarbon fuel to power their fuel cells.

The process described above can also be employed for transoceanic ships that import automobiles from foreign countries. These large car freighters are typically filled with standard cars that are ready for sale in this country or for standard cars shipped by U.S. automakers for sale overseas. The cars, if fuel cell powered and Power Park™ equipped, could propel the freighter from port to port in much the same manner that was described above for the automobile ferryboat.

T. FIG. 17 shows how biogas from a biogas digester (220) could be used to supply methane gas (222) to fuel cell powered vehicles (224) which are parked around a building (228) for the purpose of generating electrical power (226). Organic food wastes (229) and sewage (221) from the building can be processed in a digester where the generated methane gas could be piped to parking lot parking spaces (227) for employee cars to use in their on-board fuel cells, thus generating electricity for the building. This system could be typically applied at but not limited to:

Existing office and new office buildings

Commercial establishments

Factory or manufacturing facilities

Industrial sites

Apartment buildings

Clustered residential housing

High volume public facilities such as theaters, shopping malls, churches, schools, stadiums, etc.

Government buildings

Remote office buildings not currently serviced by natural gas supplies from gas distribution companies Sewage treatment facilities where large amounts of sewage are routinely handled and biogas digesters are already installed or could be installed Military barracks Airports Transportation terminals for trains U. FIG. 18 shows a towable, two wheeled, portable, self-contained, fuel cell generator, with an on-board fuel supply (140).

This trailer would contain the entire power plant (142) for a fuel cell powered automobile except it would not be connected to the drive wheels (146) of the trailer. It would utilize an on-board fuel tank (148) containing gasoline to power the fuel cell (150).

It would also have the capability to be powered by other (160) hydrocarbon fuels like compressed natural gas, ethanol, methanol, propane, hydrogen, etc. The capability to directly tap generated D.C. or A.C. power (152) from the trailer would make it an ideal portable emergency generator, or for off road use, camping or for military and industrial applications. Included would be fuel input ports for off-board uptake of a variety of hydrocarbon fuels.

V. FIG. 18a shows this portable fuel cell powered generator (140) being used to increase the driving range of an electric/hybrid vehicle.

The device would be actively towed (172) behind the electric/hybrid vehicle (162). In this application, as the electric vehicle's batteries run low on their charge, the fuel cell generator (140) would be engaged to take over the task of supplying electricity to the drive wheels (164) of the electric vehicle and also to trickle charge (166) the batteries to restore them to full charge. This would greatly increase the range of the vehicle. Control cables (168) and electric power cables (170) would link the towed two wheeled portable fuel cell generator to the electric/hybrid vehicle control and energy circuits. Such a power generating trailer could also be used to propel and recharge a battery/flywheel vehicle as well as thus serving to both trickle charge the batteries and recharge the spinning energy of the flywheel.

This unique invention captured in FIG. 18a is also valuable for contributing to cleaning the air in urban areas. When in the city limits, the electric/hybrid vehicle could be run strictly on its own battery power for essentially zero emissions. When outside the city limits, the fuel cell in the trailer could be energized to drive the wheels for long distance travel, and to recharge the batteries.

W. FIG. 18b illustrates how the towable fuel cell generator (140) can be unhooked from the vehicle (162) and left in the garage (175) of a home to provide on-site generation of electric power for the grid and home.

Here in the garage, the trailer would be hooked to an off-board supply of fuel (180) such as natural gas and its output (185) connected to the electric circuit/s in the garage for feeding back to the utility grid. While left in the garage, the trailer could use it's on-board supply of fuel to generate electricity if desired such flexibility would make this trailer an ideal emergency generator in case of prolonged utility power outages.

The towable fuel cell powered generator described in FIGS. 18, 18*a*, and 18*b* can be towed behind any vehicle, including internal combustion engine vehicles and used for the generation of electrical power wherever it is needed.

The compactness of the portable fuel cell generator discussed in FIGS. 18, 18*a*, and 18*b* can be exploited for the location of such a portable unit (minus its wheel and trailer) in trucks and trains for driving electric vapor compression refrigeration or air conditioning systems. Compactness as discussed here would make it quite useful for remote site operations, or for construction site power needs.

X. FIG. 19 illustrates how this invention and a fuel cell vehicle (231) can direct all of its outputs and byproducts to service a greenhouse 230).

The vehicle (231) produces electricity which is utilized to operate the facility. The electricity could run the lights, the pumps, the fans for cooling, and provide electricity for supplemental lighting at night. Carbon dioxide produced from reforming hydrocarbon bearing fuels could be collected in a carbon dioxide tank (232) and provided to assist plants in their growing. Water from the fuel cell could be collected in a water or water heat tank (233) to provide all or part of the water supply for the greenhouse. The heated water from the heat tank (233) could be utilized for heat for the greenhouse. The water at approximately 160–180 degrees F. could be pumped through lines in the floor or under benches to warm the plants.

Y. FIG. 20 illustrates how this invention and the utilization of water produced from a fuel cell to provide useable and potable water.

Water is a precious and life saving commodity. This figure illustrates a fuel cell whether in a vehicle or in building providing water. The water from the fuel cell is pure water and fit for many uses. Here the water from the fuel cell condensed from water vapor is provided by a line to a pure water tank (235) with a pump (236) to provide water to faucet system (240). The water would be a useful be a useful byproduct of generation for the vehicle owner. While typical "city water" would be provided at a charge and usage metered as depicted by meter (237). Although not depicted with a meter, water is so precious that in many areas it could be more precious than the electricity created and a meter may be envisioned between the pump (236) and the faucet (240).

Z. FIG. 21 illustrates how this invention and the utilization of heated water produced from a fuel cell to provide domestic hot water and drinking water.

The fuel cell whether in a vehicle or in the basement of a residence or other location produces byproducts in its generation of electricity. This invention captures and utilizes these byproducts for the benefit of mankind. The byproduct of this illustration is that of hot water. The water is typically between 160–180 degrees F. and is captured from the fuel cell via a line into a pure water tank (235) and provided to faucet (240) via pump (236). The tank (235) could also be used as a hot water tank depending upon the electricity generated and the number of vehicles that were contributing to the supply. The tank could contain a heat exchanger element to heat the water in an adjacent hot water tank (239). This figure illustrates that "city water" could supplement if necessary by the illustration of the meter shown as (237). As with FIG. 20 a meter could be installed anywhere along the fuel cell side between the fuel cell and the faucet (240) if this water were to be provided as a pure water service. Although not illustrated, but as FIG. 19 brings the heat of water to run underneath the benches of the greenhouse, so hot water pumped from the tanks illustrated could provide heat to lines buried in a floor to provide radiant heating to a home or building.

VI. SIGNIFICANCE OF THIS INVENTION

The significance of this invention involves providing and teaching the processes, methods, and apparatus to enhance and make Power Park™ a more workable and commercial system and includes the following:

A. The Power Park™ processes provides innovative supporting and enabling infrastructure which further exemplifies the practical utilization of the Power Park™ U.S. patent application Ser. No. 08/557,339.

This patent will provide opportunities for the United States and developing countries by removing the need to have a hard wired electric utility system in place before true progress can be made. With the use of fuel cell powered vehicles for the dual use of transportation and electric power generation, a person could avoid the cost of an expensive utility infrastructure. One could generate the power cleanly and locally.

Villages can be powered through fuel cell powered cars, scooters, motorbikes, and other forms of transportation.

B. This invention has developed the various methods and processes for utilizing the electric and non-electric outputs of the vehicle.

As an example the fuel cell powered vehicle can produce other products of operation which have value, and these products include: A.C. electric power, D.C. electric power, hydrogen, oxygen, carbon dioxide, pure water, and heat.

Power Park™ by its nature utilizes the invention of combining fuel cell powered vehicles in a modular configuration that can serve an electric load and in essence be disassembled as needed and moved and reassembled from site to site. To physically move electrical generation from site to site with the ease of moving an automobile is a new and unique way to provide electrical power in a novel and commercially viable way.

C. This invention has the ability to accommodate a wide variety of fuels from liquid to gaseous forms including all hydrocarbon and pure gases such as hydrogen. Solar derived fuels, such as biogas from methane digesters, can also be used in this invention.

D. The patent teaches the specific utilization that is unique to Power Park™ and shows in detail how to connect the electric and nonelectric outputs of the vehicle to a residence, commercial building, over head cantentery system, or industrial complex.

Our invention recognizes the fundamental reason why electrical demand occurs at all is because of the presence of humans or human controlled processes. One of the things that most often accompanies the human is the car. Thus, with the fuel cell powered car, with our Power Park invention, the power plant is always there with the human, ready to serve the electric load created by that human.

E. This invention not only has direct applications to the fuel cell mobile generation market but to the stationary or fixed use of fuel cells in residences, commercial buildings or industrial complexes.

As an example, the recent January 1998 ice storm that hit the upper northeast and Canadian border areas with a massive and sustained power outage that lasted several months in some cases. Close to 1 million people were without power, and without emergency generators. With fuel cell powered cars in their driveways or stationary fuel cell located in their garages and basements and connected as this patent teaches, those people would have had electricity, water, and a source of life saving heat.

What is claimed is:

1. Apparatus for connecting a fuel cell powered vehicle to a building for supplying electric power from the fuel cell in the vehicle to the building, comprising:
   a) a plurality of lines including a water line and an electric line for connecting the fuel cell in the vehicle to the building;
   b) means for connecting the electric line from the vehicle to an electric power panel of the building;
   c) means for connecting the water line from the building to the vehicle water tank or water heater; and
   d) a fuel line and means for connecting the fuel cell to said fuel line.

2. Apparatus in accordance with claim 1, further including a vent line or vent and means for connecting the fuel cell to said vent or vent line.

3. Apparatus in accordance with claim 1, further including a fuel regulator or other means for allowing the fuel cell to vary its electrical output.

4. Apparatus in accordance with claim 3, further including communications means for allowing the fuel cell to be load following and dispatchable.

5. Apparatus in accordance with claim 1, further including a switch or other means for energizing the fuel cell when the vehicle is not in locomotion.

6. A method of generating, transmitting, and distributing electric power from a plurality of vehicle to the catenary system of the train, comprising the steps of:
   a) providing a generation system including a plurality of fuel cell powered vehicles for generating electricity;
   b) providing means for connecting said vehicles electrically to said catenary system;
   c) providing an electric transmission and distribution system being said catenary, and
   d) connecting said catenary system to a load or a conventional electric utility.

7. A method of generating, transmitting, and distributing electric power from a plurality of vehicles in a parking lot to a load, comprising the steps of:
   a) providing a generation system including a plurality of fuel cell powered vehicles for generating electricity;
   b) connecting said vehicles electrically to a transmission and distribution system;
   c) providing an electric transmission and distribution system being the electric connections between the vehicles and electric receptacles in said parking lot; and
   d) connecting said parking lot electric system to a load or a conventional electric utility.

8. Apparatus for the widespread production and distribution of electricity by a plurality of vehicles connected to a utility grid, comprising:
   a) a plurality of fuel cell powered vehicles in a parking lot generating electricity;
   b) means for connecting said vehicles into a vehicle network at said parking lot;
   c) electric lines for transferring electricity from said vehicle network to the utility grid;
   d) a plurality of parking lots; and
   e) means for connecting the electrical output from said vehicle networks of said plurality of parking lots and transferring said electrical output to said utility grid.

* * * * *